US010019625B2

(12) United States Patent
Wexler et al.

(10) Patent No.: US 10,019,625 B2
(45) Date of Patent: Jul. 10, 2018

(54) WEARABLE CAMERA FOR REPORTING THE TIME BASED ON WRIST-RELATED TRIGGER

(71) Applicant: OrCam Technologies Ltd., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

( * ) Notice: Subject to any disclaimer, the term of this patent is extended or adjusted under 35 U.S.C. 154(b) by 50 days.

(21) Appl. No.: 15/167,181

(22) Filed: May 27, 2016

(65) Prior Publication Data

US 2017/0024612 A1     Jan. 26, 2017

Related U.S. Application Data

(60) Provisional application No. 62/196,029, filed on Jul. 23, 2015.

(51) Int. Cl.
    *G06K 9/00*    (2006.01)
    *H04N 5/225*   (2006.01)

(52) U.S. Cl.
    CPC ....... *G06K 9/00389* (2013.01); *H04N 5/2257* (2013.01); *G06K 9/00355* (2013.01)

(58) Field of Classification Search
    CPC ........... G06K 9/00389; G06K 9/00355; G06K 9/00671; G06K 9/00375; H04N 5/2257; H04N 5/2252; H04N 5/2251; H04N 5/2254; H04N 5/23216; H04N 5/23219; H04N 5/23229; H04N 7/183; H04N 7/185; H04N 13/0239; H04N 13/044; H04N 21/4223; H04N 21/8545; A61B 5/0024; A61B 5/02438; A61B 5/742; A61B 5/743; A61B 5/7455; A61B 5/6803; G02B 24/017; G02B 27/0172; G02B 27/0093; G02B 2027/0178; G02B 2027/0179; G02B 2027/0138; G02B 2027/014; G02B 2027/0187; G06F 1/163; G06F 1/1639; G06F 1/1673; G06F 1/1686; G06F 1/1696; G06F 3/017; G06F 3/011; G06F 3/055; G06F 3/014; G06F 3/0304; G06F 3/0346; G06F 3/042; G06F 3/04225; G06F 3/0426; G06F 2203/0331;

(Continued)

(56) References Cited

U.S. PATENT DOCUMENTS 9,141,194 B1 * 9/2015 Keyes ............... G06F 3/017
9,377,626 B2 * 6/2016 Lyons ............... G02B 27/0172

(Continued)

*Primary Examiner* — Jose Couso
(74) *Attorney, Agent, or Firm* — Finnegan, Henderson, Farabow, Garrett & Dunner, LLP

(57) ABSTRACT

A wearable device and method are provided for reporting the time based on a wrist-related trigger. In one implementation, a wearable apparatus for providing time information to a user includes a wearable image sensor configured to capture real-time image data from an environment of a user of the wearable apparatus. The wearable apparatus also includes at least one processing device programmed to identify in the image data a wrist-related trigger associated with the user. The processing device is also programmed to provide an output to the user, the output including the time information, based on at least the identification of the wrist-related trigger.

29 Claims, 19 Drawing Sheets

(58) Field of Classification Search
CPC . G06T 2207/10004; G06T 2207/10016; A63F 13/06; A63F 13/211; A63F 13/428; A63F 2300/10; G09B 21/008; G09B 21/001; G09B 21/00; H04L 67/32
See application file for complete search history.

(56) References Cited

U.S. PATENT DOCUMENTS

| | | | |
|---|---|---|---|
| 9,448,621 B2* | 9/2016 | Reponen | G04G 9/007 |
| 9,639,164 B2* | 5/2017 | Yamada | G06F 3/017 |
| 9,746,941 B2* | 8/2017 | Raffa | G06F 3/0346 |
| 2007/0220108 A1* | 9/2007 | Whitaker | G06F 3/017 |
| | | | 709/217 |
| 2010/0199232 A1* | 8/2010 | Mistry | G06F 1/163 |
| | | | 715/863 |
| 2011/0213664 A1* | 9/2011 | Osterhout | G02B 27/017 |
| | | | 705/14.58 |
| 2013/0120459 A1* | 5/2013 | Dickinson | G06F 1/163 |
| | | | 345/650 |
| 2014/0168068 A1* | 6/2014 | Kim | G06F 3/017 |
| | | | 345/156 |
| 2015/0073907 A1* | 3/2015 | Purves | G06Q 20/32 |
| | | | 705/14.58 |
| 2016/0091965 A1* | 3/2016 | Wang | G06F 3/011 |
| | | | 345/156 |
| 2016/0112636 A1* | 4/2016 | Yamaguchi | H04N 5/23245 |
| | | | 348/158 |

* cited by examiner

WEARABLE CAMERA FOR REPORTING THE TIME BASED ON WRIST-RELATED TRIGGER

CROSS REFERENCE TO RELATED APPLICATION

This application claims the benefit of priority of U.S. Provisional Patent Application No. 62/196,029, filed on Jul. 23, 2015, which is incorporated herein by reference in its entirety.

BACKGROUND

I. Technical Field

This disclosure generally relates to devices and methods for capturing and processing images from an environment of a user. More particularly, this disclosure relates to devices and methods for identifying a wrist-related trigger in a processed image and for reporting the time based on the wrist-related trigger.

II. Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment. Therefore, there is a need for apparatuses and methods for automatically capturing and processing images in a manner that provides useful information to users of the apparatuses. For example, there is a need to enable context specific determinations based on the automatic capturing and processing of images to interpret certain gestures of the user or others, and to provide useful feedback or perform a desired action. One such desired action includes providing an indication of the current time or time information based on an identified wrist-related trigger or gesture of the user.

SUMMARY

Embodiments consistent with the present disclosure provide an apparatus and methods for automatically capturing and processing images from an environment of a user and identifying a wrist-related trigger in the processed images to generate an output of a current time to the user based on the wrist-related trigger.

In accordance with a disclosed embodiment, a wearable apparatus for providing time information to a user includes a wearable image sensor configured to capture real-time image data from an environment of a user of the wearable apparatus. The wearable apparatus also includes at least one processing device programmed to identify in the image data a wrist-related trigger associated with the user. The processing device is also programmed to provide an output to the user, the output including the time information, based on at least the identification of the wrist-related trigger.

In accordance with another disclosed embodiment, a wearable apparatus for providing time information to a user includes a wearable glasses unit and an image sensor associated therewith, the image sensor being configured to capture real-time image data from an environment of the user. The wearable apparatus also includes at least one processing device programmed to identify in the image data a trigger, wherein the trigger is based on at least an appearance of at least a portion of a wrist region of the user in the image data, and provide an output to the user, the output including the time information, based on at least the identification of the trigger.

In accordance with another disclosed embodiment, a method for providing time information to a user using a wearable device is provided. The method includes capturing, via a wearable image sensor of the wearable device, real time image data from an environment of the user and identifying in the image data a trigger. The trigger is based on at least an appearance of at least a portion of a wrist region of the user in the image data. The method also includes providing an output to the user, the output including the time information, based on at least the identification of the trigger.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1A:
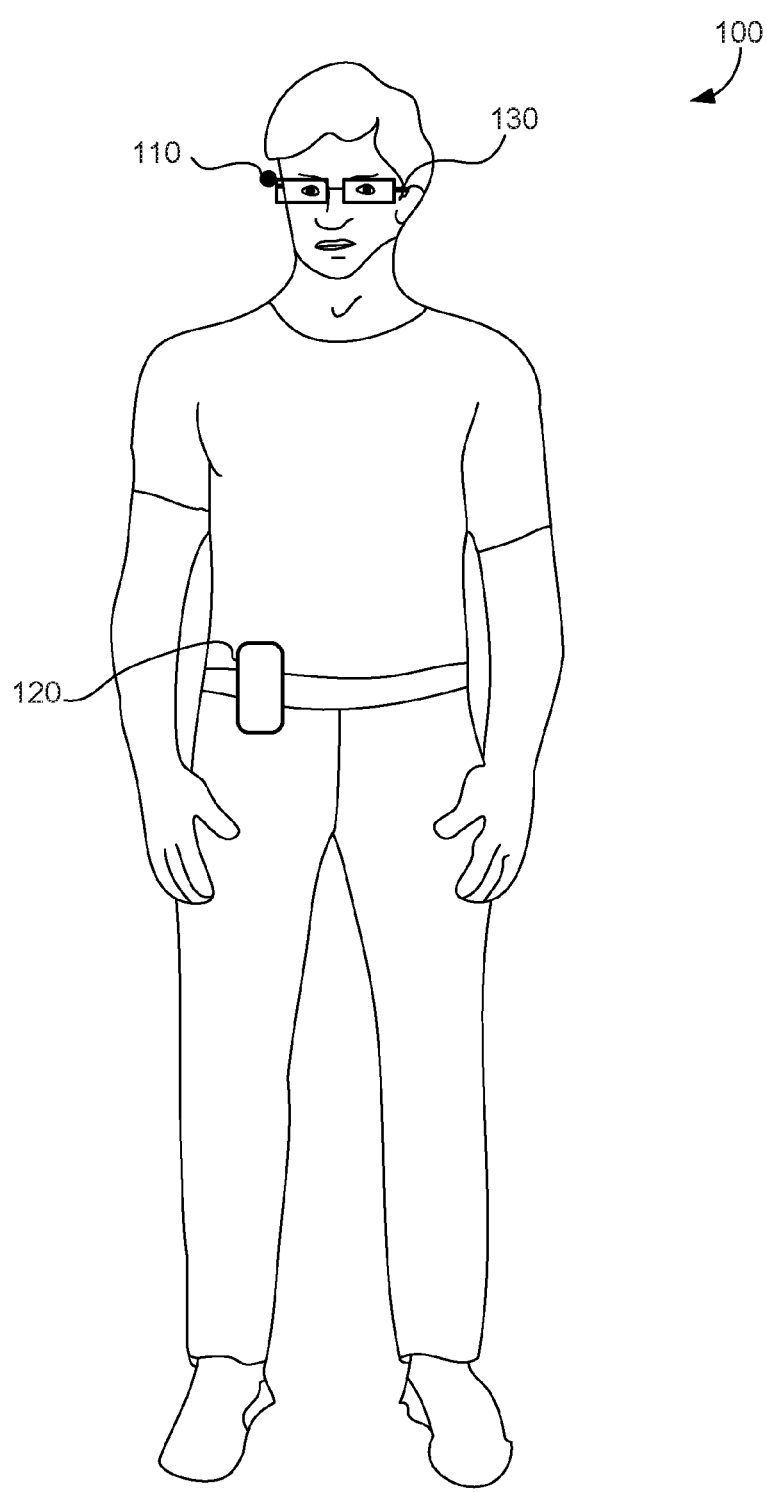
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Disclosed embodiments provide wearable apparatuses and methods for capturing and processing images, identifying a wrist-related trigger in the images, and providing feedback to a user of a current time or other time information based on the identified trigger. One example of the disclosed embodiments is a wearable apparatus that includes a camera configured to capture real-time image data from an environment of the user. The wearable apparatus may use program instructions to determine when to capture images. Accordingly, the wearable apparatus may automatically capture images from the user's environment based at least on the program instructions. The wearable apparatus also may include a processing unit configured to process the real-time image data and to make real-time decisions about the data and provide real-time feedback to the user. The processing unit may determine, for example, which type of data to store (e.g., video, audio, or still images), which images to store (e.g., avoid storing repetitive images), which image resolution to use (e.g., using high-resolution when capturing a family member), which feedback to provide based on a determined gesture, and so on. Real-time feedback may include, for example, an output that audibly or visibly indicates a current time or other time information.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or more lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
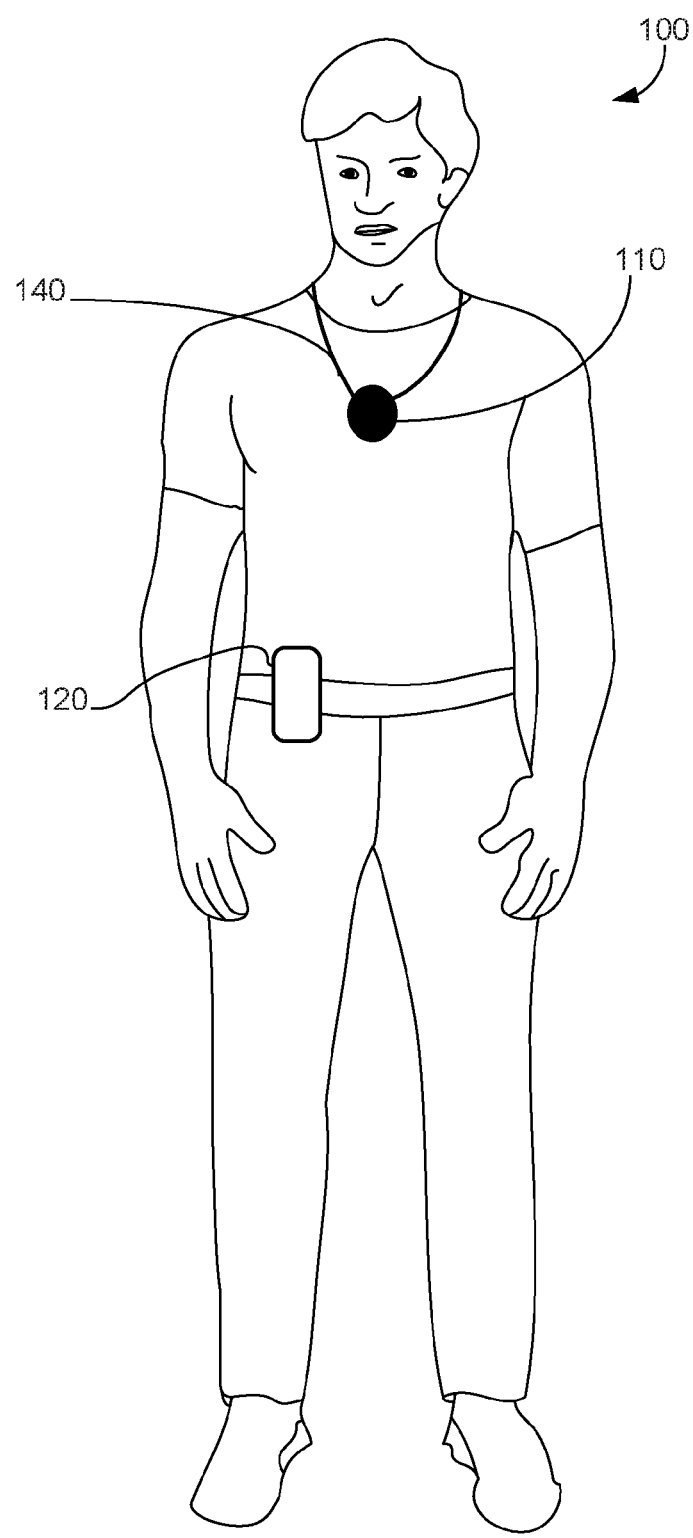
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
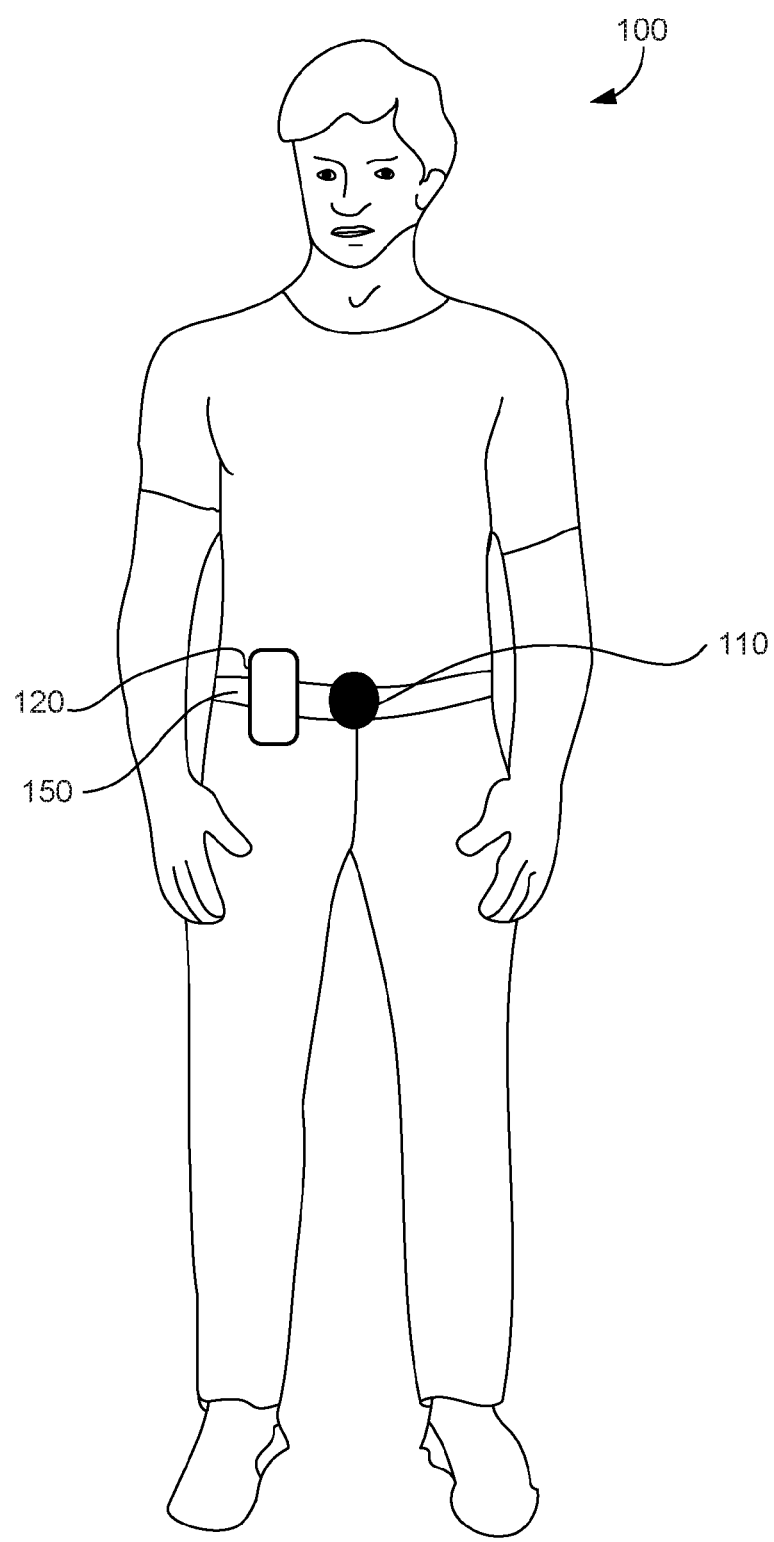
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
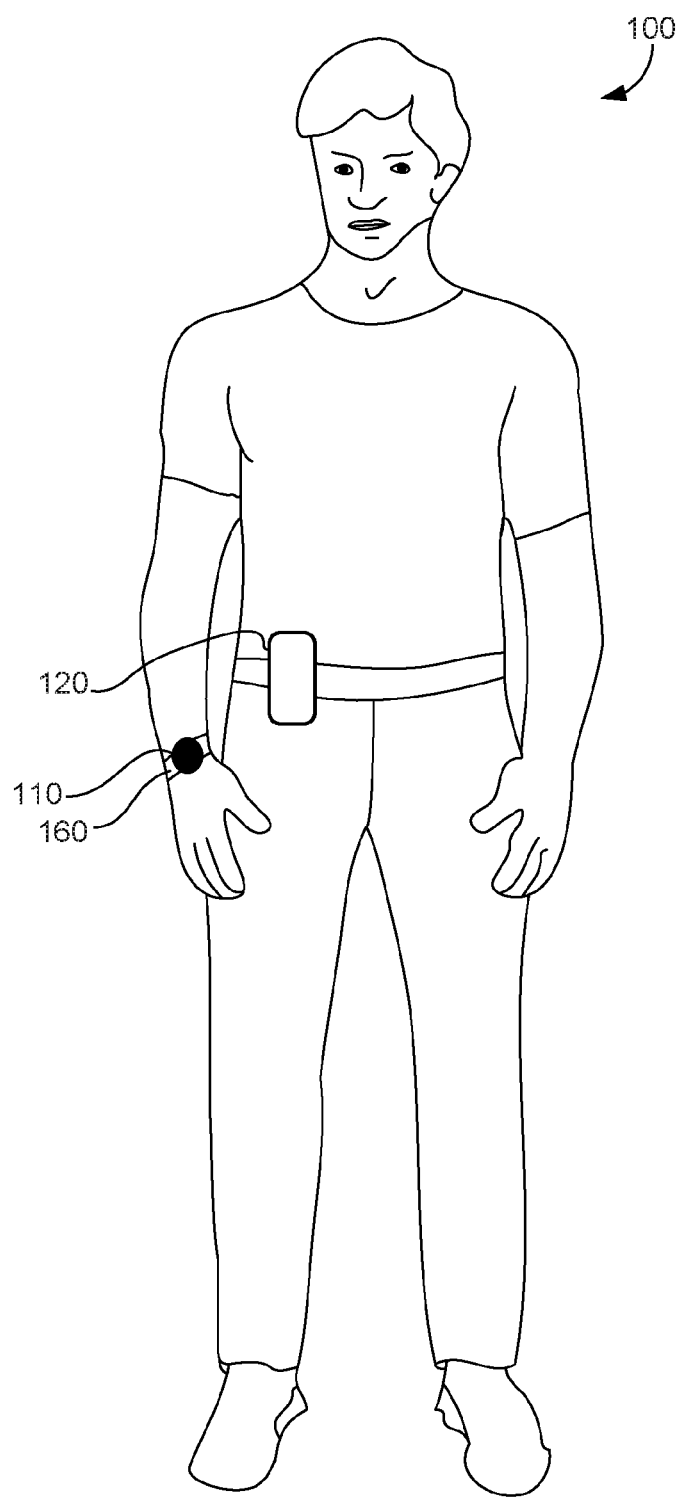
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

Figure 2:
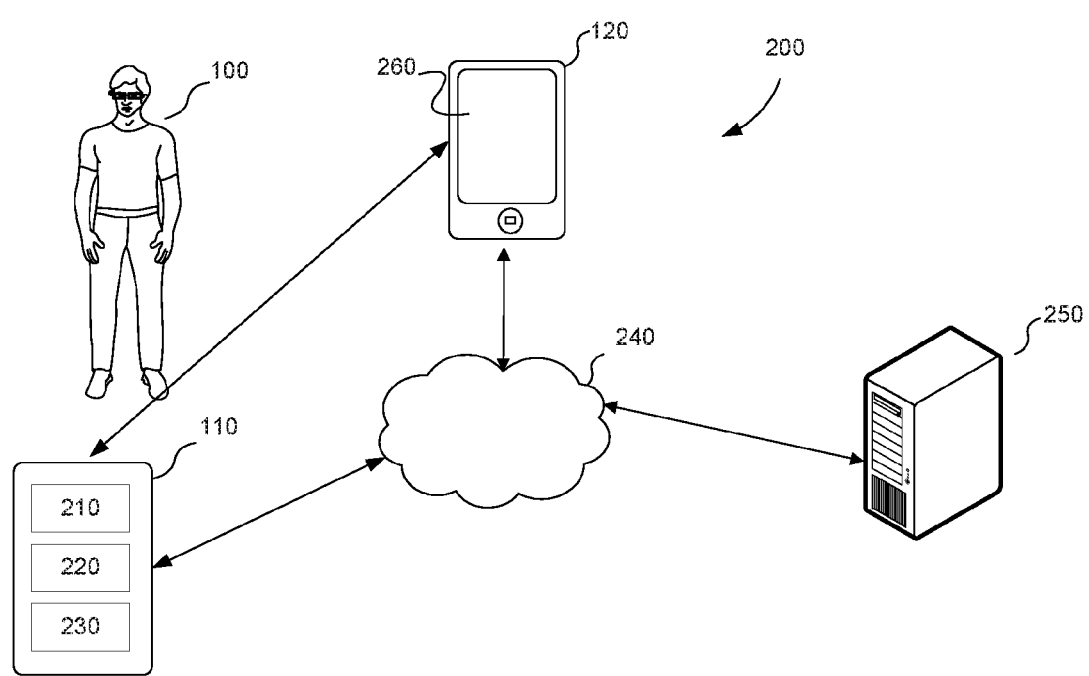
FIG. 2 is a schematic illustration of an example system consistent with the disclosed embodiments.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-field capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
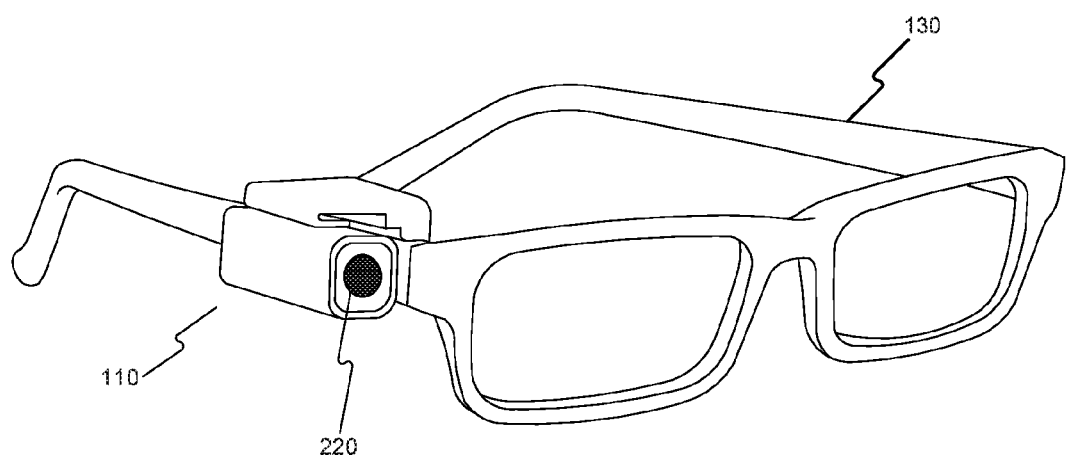
FIG. 3A is a schematic illustration of an example of the wearable apparatus shown in FIG. 1A.

An example of wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

Figure 3B:
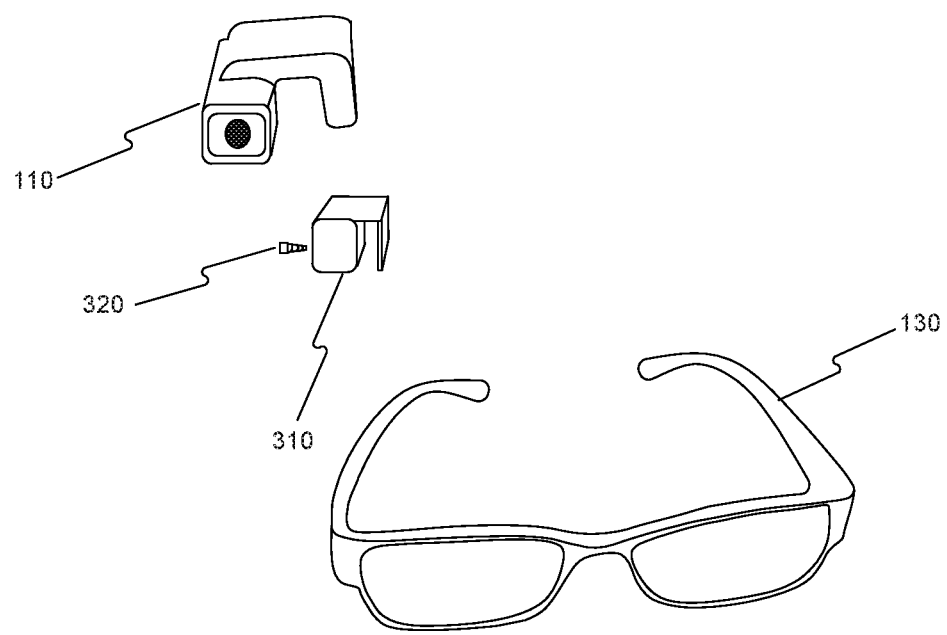
FIG. 3B is an exploded view of the example of the wearable apparatus shown in FIG. 3A.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

Figure 4A:
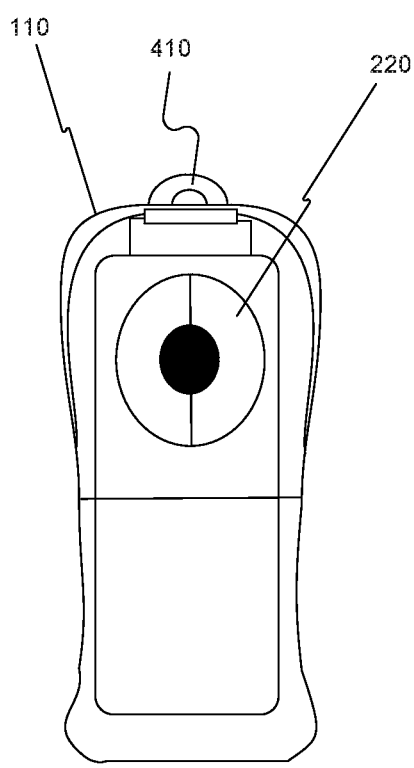
FIG. 4A is a schematic illustration of an example of the wearable apparatus shown in FIG. 1B from a first viewpoint.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

Figure 4B:
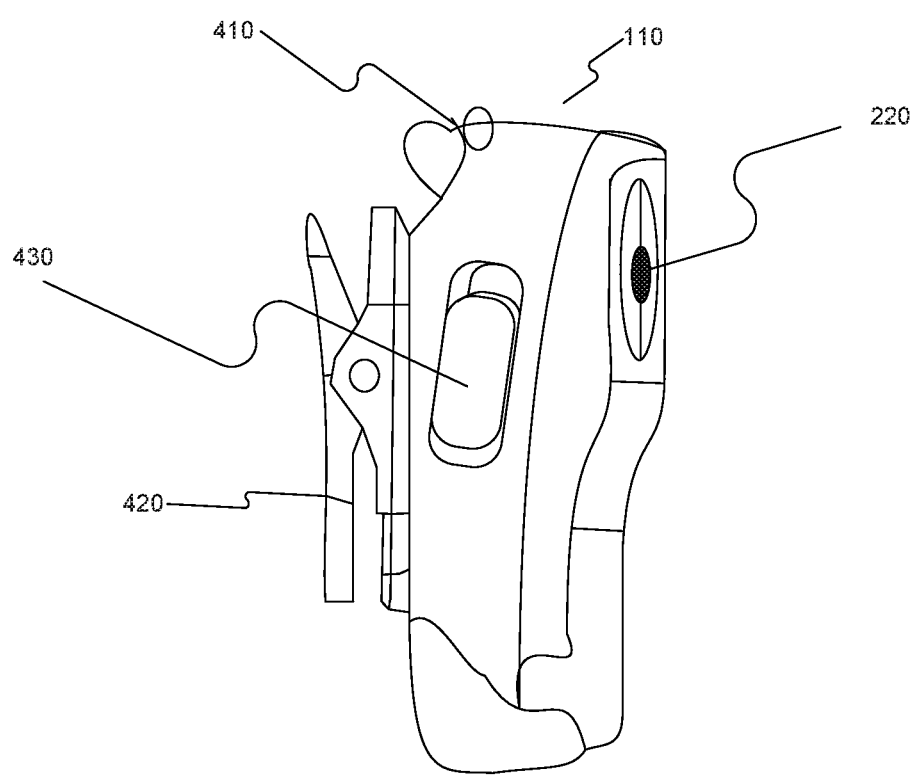
FIG. 4B is a schematic illustration of the example of the wearable apparatus shown in FIG. 1B from a second viewpoint.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
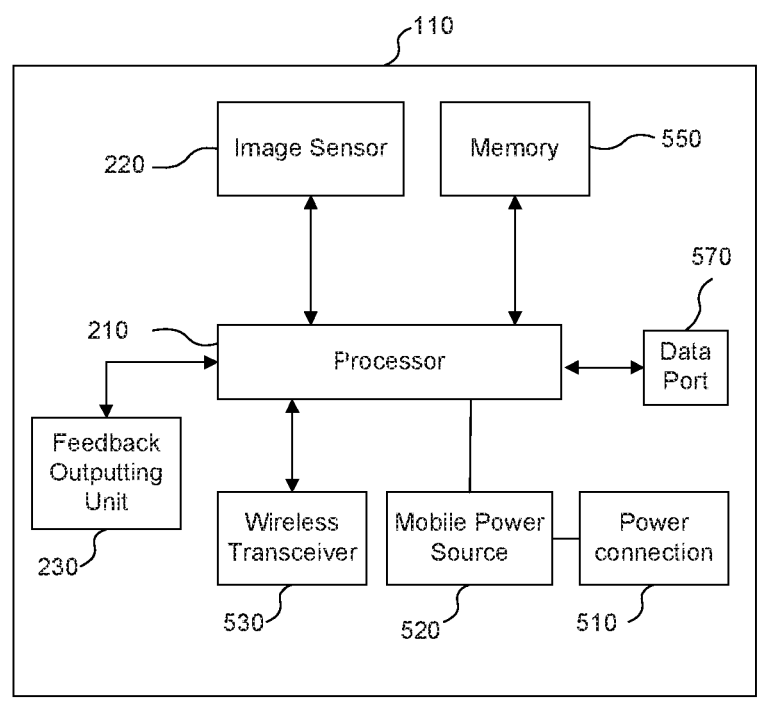
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 510 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
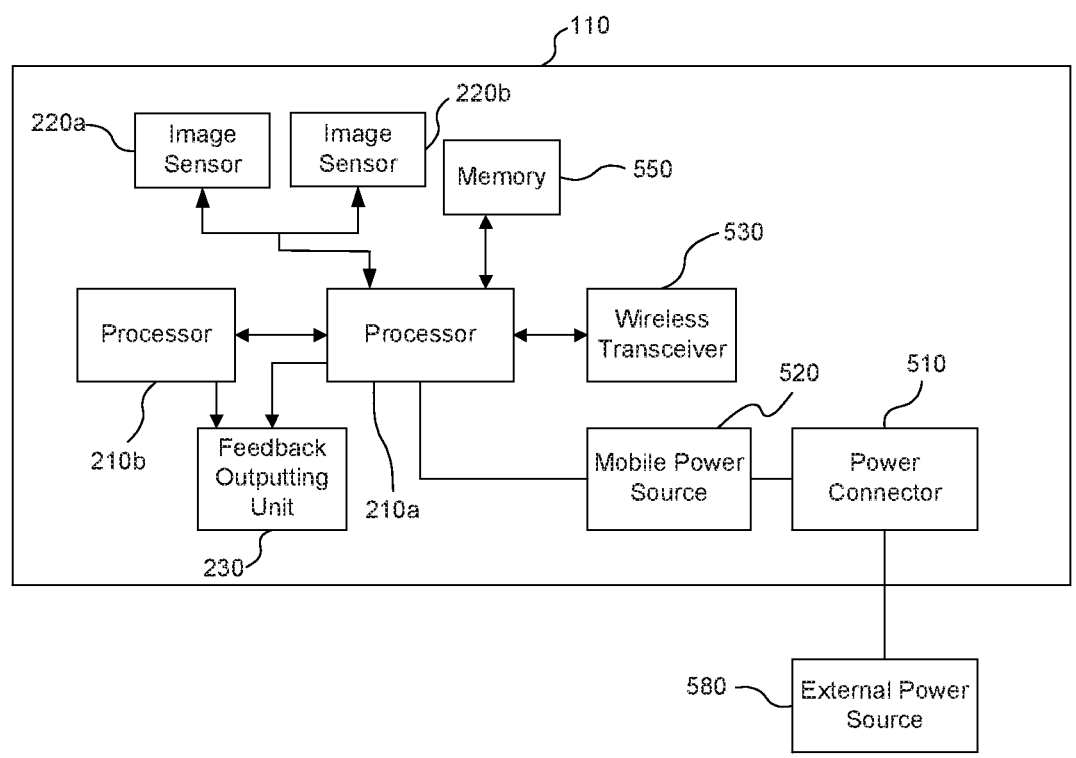
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identified hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
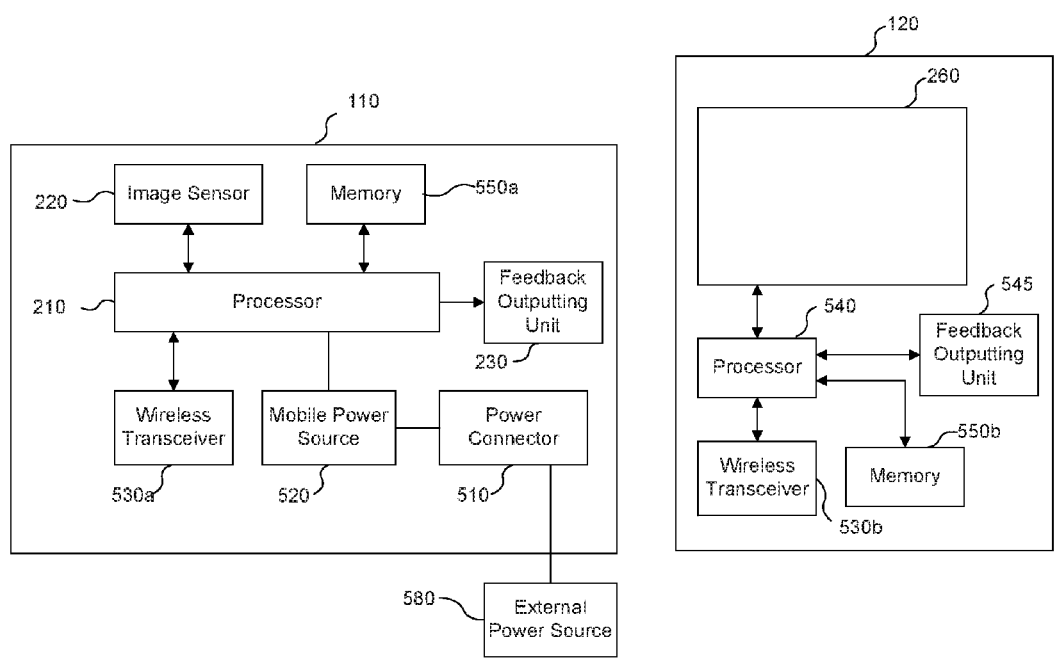
FIG. 5C is a block diagram illustrating an example of the components of a wearable apparatus according to a third embodiment.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. Therefore, the foregoing configurations are examples and, regardless of the configurations discussed above, apparatus 110 can capture, store, and process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

An embodiment consistent with the present disclosure provides a system and a method for providing user 100 with time information based on one or more triggers or situations detected within the field of view of apparatus 110. Apparatus 110 may be configured to identify a wrist-related trigger in real-time image data. The apparatus may further identify in the image data one or more objects associated with the wrist-related trigger, as well as a context associated with the environment and/or the wrist-related trigger. Based on the wrist-related trigger and/or identified context, apparatus 110 may select one of a plurality of alternative actions to execute or feedback to provide. The capability of apparatus 110 to automatically select and execute actions based on an identified trigger may provide user 100 with the opportunity to more efficiently perform certain actions (such as learning the current time) and fully interact with their surrounding environment.

Figure 6:
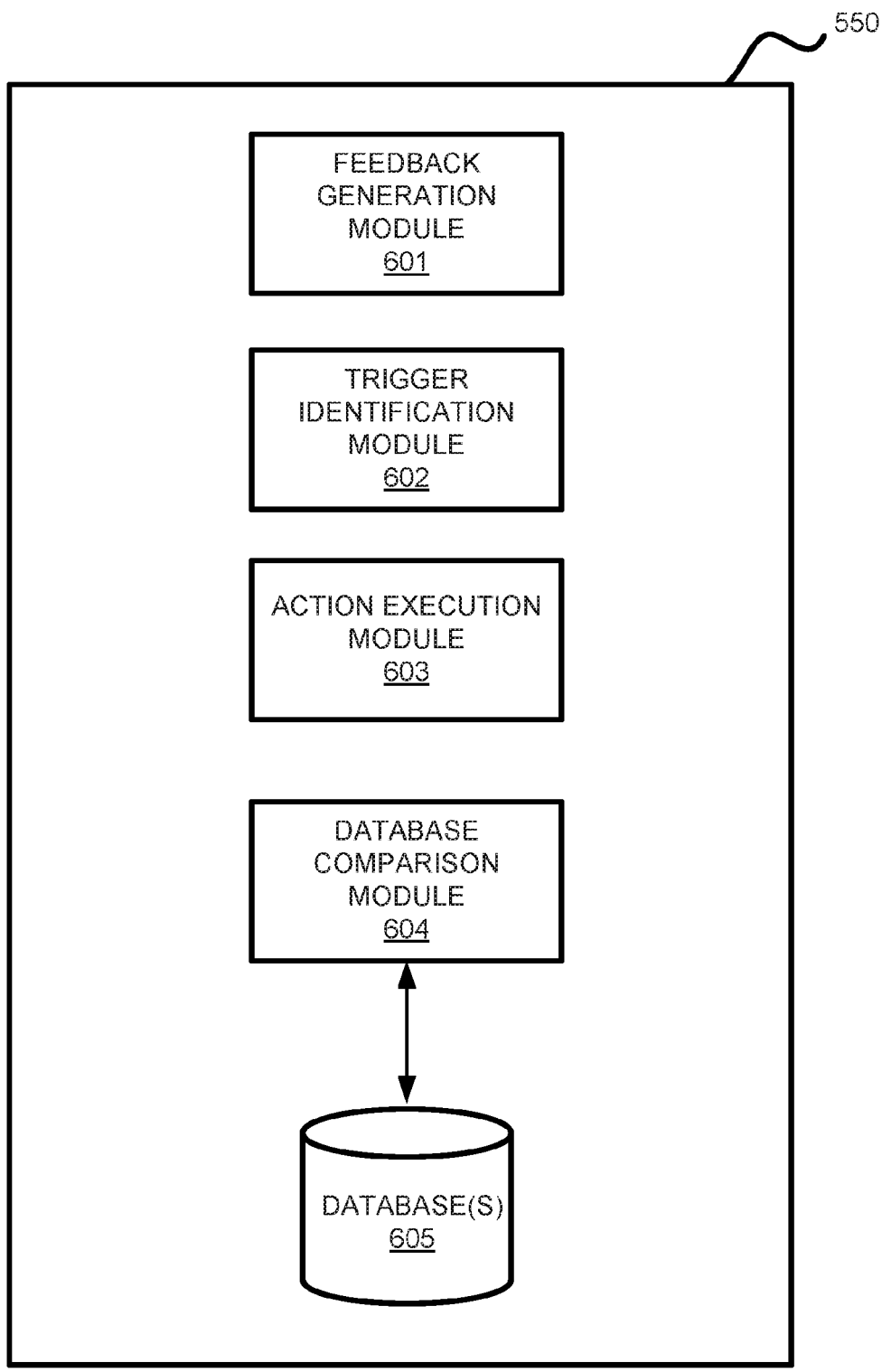
FIG. 6 is a block diagram illustrating an example of a memory contained within an apparatus for providing feedback to a person based on a trigger.

FIG. 6 is a block diagram illustrating a memory (e.g., 550, 550a, or 550b) associated with apparatus 110 or computing device 120 according to the disclosed embodiments. The memory may include one or more modules, or sets of instructions, for performing a method consistent with the disclosed embodiments. For example, a memory may include instructions for a processor to capture images from an environment of a user via an image sensor, analyze the captured images, identify a wrist-related trigger in the analyzed image data, and output feedback of time information via one or more available output devices. In the example shown in FIG. 6, memory 550 comprises a feedback generation module 601, a trigger identification module 602, an action execution module 603, a database comparison module 604, and one or more databases 605 for performing the functionality of the disclosed methods. The modules shown in FIG. 6 are by example only, a processor in the disclosed embodiments may operate according to any suitable image analysis and feedback scheme.

Feedback generation module 601 may provide functionality for apparatus 110 (or computing device 120) to generate and transmit feedback or information to user 100 in response to an identified wrist-related or environmental trigger or some other query. Processor 210 or 540 may execute feedback generation module 601 to generate and process feedback in a given context, then transmit the generated feedback to feedback-outputting unit 230 or 545 for output to user 100. In some embodiments, processor 210 or 540 and feedback-outputting unit 230 or 545 may be operatively connected via an electrical connection. In other embodiments, processor 210 or 540 and feedback-outputting unit 230 or 545 may be operatively connected via wireless transceiver(s) 530. As discussed above, in some embodiments, feedback generation module 601 may generate audible or visible feedback to user 100. In other embodiments, the feedback may be tactile in nature, such as a vibration.

Trigger identification module 602 may provide functionality for apparatus 110 to identify, in real-time, audible or visual triggers that may precipitate a change in an operational status of apparatus 110. As used in this disclosure, a "trigger" may include, for example, the appearance of user 100's wrist within the field of view of apparatus 110 in a certain position or while making a pre-defined gesture. Any external stimulus may constitute a trigger, including gestures performed by persons other than the user, and/or auditory signals. In some embodiments, for example, user 100 may be able to audibly say words that serve as triggers, such as "Show," "When," "What," etc. It is understood that these are non-limiting examples. Trigger identification module 602 may be configured to detect the presence of triggers and cause processor 210 or 540 to execute software instructions that operate apparatus 110 or computing device 120 in a manner associated with the trigger. For example, in the disclosed embodiments, trigger identification module 602 may be configured to detect a wrist-related trigger and cause processor 210 or 540 to output feedback to a user of time information, as described in further detail below.

Action execution module 603 may provide functionality for apparatus 110 to execute various functions in response to stimuli, be they triggers managed by user 100, the appearance of objects within the field of view of apparatus 110, or other events occurring while apparatus 110 is in operation. Action execution module 603 may, for example, coordinate the configuration and execution of one or more alternative actions that may be available to apparatus 110 upon positive identification of a wrist-related trigger, other triggers, an object, or a particular situation, etc.

Database comparison module 604 may provide functionality for apparatus 110 to compare objects detected in the user environment, such as a user's wrist or a wristwatch, to objects and/or categories of said objects in a database, such as database(s) 605, to be described in detail below. In some embodiments, database comparison module 604 may derive information from real-time image data received from image sensor 220. In other embodiments, other software elements or processors may derive the information and provide it to database comparison module 604. For example, processor 210 or 540 may execute database comparison module 604 to access one or more of the described databases, and compare the information derived from the received real-time image data with information in the databases. If the derived information corresponds to information found in one or more of the databases, database comparison module 604 may provide an indication to feedback generation module 601 to that effect, as discussed in further detail below in association with FIGS. 9-11.

Database(s) 605 may comprise one or more databases that store information and are accessed and/or managed through memory 550 (and/or 550a, 550b). By way of example, databases 605 may include document management systems, Microsoft™ SQL databases, SharePoint™ databases, Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. Databases 605 may contain software code or macros that facilitate rapid searching and comparison by database comparison module 604.

Feedback generation module 601, trigger identification module 602, action execution module 603, and database comparison module 604 may be implemented in software, hardware, firmware, a mix of any of those, or the like. For example, if the modules are implemented in software, they may be stored in memory 550, as shown in FIG. 6. Other components of processing unit 210 or 540 may be configured to perform processes to implement and facilitate operations of the modules. Thus, feedback generation module 601, trigger identification module 602, action execution module 603, and database comparison module 604 may include software, hardware, or firmware instructions (or a combination thereof) executable by one or more processors (e.g., processor 210 or 540), alone or in various combinations with each other. For example, the modules may be configured to interact with each other and/or other modules of apparatus 110 to perform functions consistent with disclosed embodiments. In some embodiments, any of the disclosed modules (e.g., feedback generation module 601, trigger identification module 602, action execution module 603, and database comparison module 604) may each include dedicated sensors (e.g., IR, image sensors, etc.) and/or dedicated application processing devices to perform the functionality associated with each module.

As used herein, real-time image data may refer to image data captured in real-time or near real-time. For example, trigger identification module 602 may monitor the field-of-view of apparatus 110 to detect triggers, such as a wrist-related trigger, or other inputs, while action execution module 603 may determine whether to execute a particular action based on a detected trigger. Accordingly, trigger identification module 602 and action execution module 603 may operate in parallel to process captured image data. That is, apparatus 110 may capture and analyze image data in parallel, or may institute a queue-like implementation whereby image data is captured and then analyzed in a continuous fashion (i.e., a first image is captured and analyzed while a subsequent image is captured and then subsequently analyzed).

Figure 7:
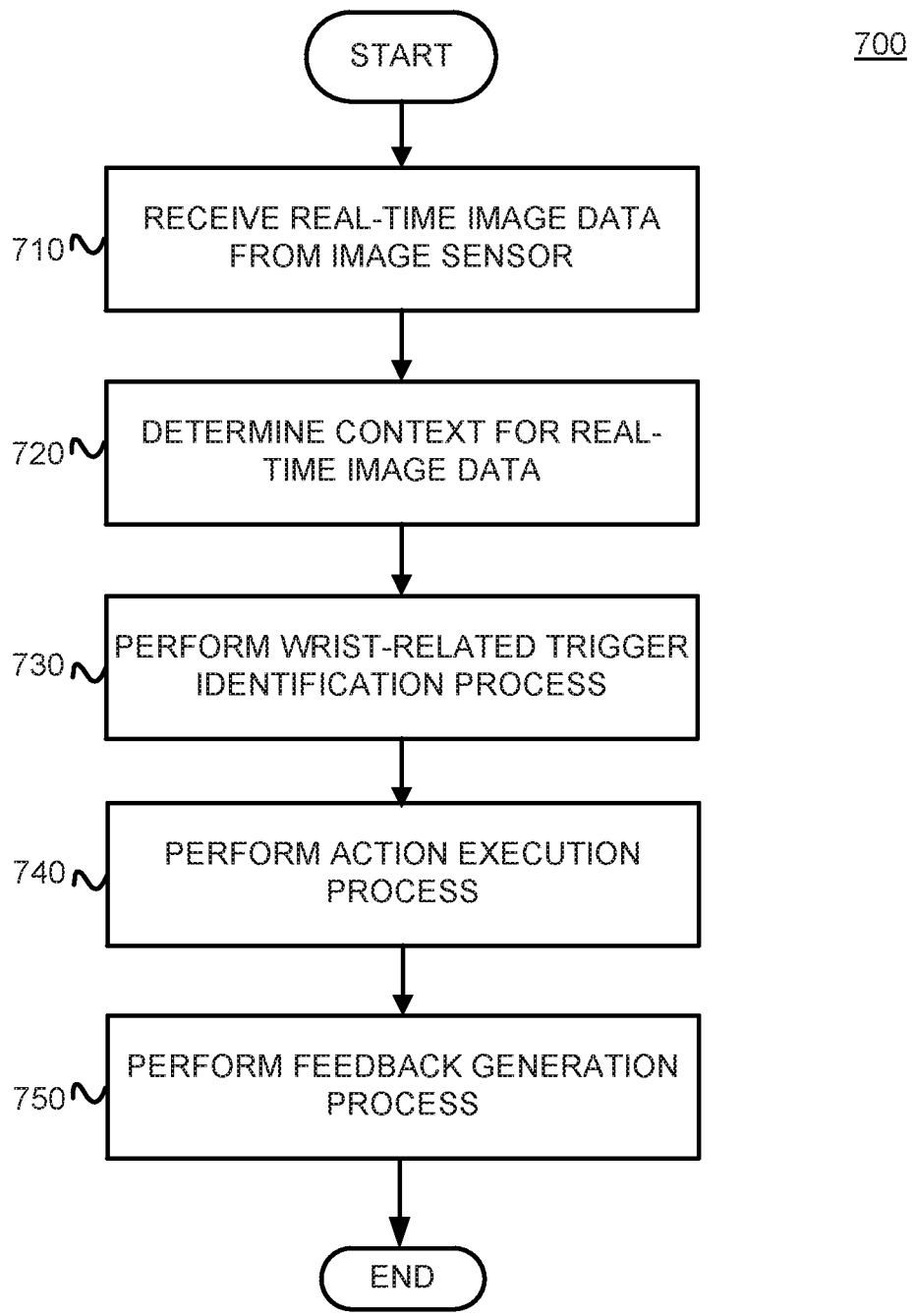
FIG. 7 is an example of a process for providing feedback to a person based on a trigger, consistent with disclosed embodiments.

FIG. 7 illustrates an example of a process 700 for providing feedback to a person based on captured image data consistent with certain disclosed embodiments. Process 700, as well as any or all of the individual steps therein, may be performed by various aspects of apparatus 110 and/or computing device 120, and any subcomponents therein. For exemplary purposes, FIG. 7 is described as being performed by processor 210 or 540, executing software instructions stored within memory 550.

Processor 210 or 540 may receive real-time image data from an image sensor, such as image sensor 220 (Step 710). In other embodiments, processor 210 or 540 may receive the image data from an intermediate component associated with image sensor 220. The intermediate component may, for example, perform image processing operations on the real-time image data before transmitting it to processor 210 or 540. In some embodiments, the real-time image data may be received as a single streaming video file. In other embodiments, the real-time image data may be received as a series of still images. When the image data is received, processor 210 or 540 may store the data in memory 550 or database(s) 605.

Processor 210 or 540 may determine a context for the received real-time image data based on stored information that facilitates the execution of one or more actions (Step 720). In some embodiments, processor 210 or 540 may execute software instructions to process the representations of one or more objects or gestures detected in the real-time image data. In some embodiments, the processing may comprise image processing, such as image rotation, a change in the size of the image, image sharpening, cropping the image, enhancing the focus, etc. It is understood that these are non-limiting examples and that any manner of image processing may be applied to the real-time image data. In other embodiments, the processing may comprise optical character recognition (OCR), when the real-time image data comprises numerals or text. In these embodiments, the optical character recognition may facilitate recognition of the visualized text by processor 210 or 540, and facilitate formation of a search query for a database containing object information. Processor 210 or 540 may further derive or determine any other information contained in the received real-time image data relating to the context of the image, such as date, time, geographical location, etc. In some embodiments, processor 210 or 540 may derive information based on a plurality of images, so as to determine whether a motion or gesture is captured in the image data.

In Step 730 of process 700, processor 210 or 540 may perform a wrist-related trigger identification process (via trigger identification module 602, for example), similar to the process described below in connection with FIG. 9. In brief, according to some embodiments, trigger identification module 602 may configure components of apparatus 110, such as image sensor 220 and/or other components of apparatus 110, to operate in a "ready mode" for trigger detection. Trigger identification module 602 may determine if any external trigger, visible or auditory, is received. In some embodiments, trigger identification module 602 may determine if a user's wrist is present in the real-time image data. In some embodiments, trigger identification module 602 may determine if a motion of a user's wrist corresponds to a wrist-related trigger. Additionally, trigger identification module may determine whether other features of a wrist-related trigger are present in the image data, such as an object corresponding to a wristwatch or a clock, or a user's pointing to a wrist region, etc. If the user's wrist (or other wrist-related trigger object or gesture) is present, trigger identification module 602 may determine the wrist-related trigger, if any, that is represented in the real-time image data.

Processor 210 or 540, via action execution module 603, may perform an action execution process, such as is described below in connection with FIG. 10 (Step 740). In brief, according to some embodiments, action execution module 603 may determine a time component associated with a wrist-related trigger identified in received real-time image data. Action execution module 603 may also determine a time-based context associated with the trigger. Based on the identified wrist-related trigger and context, action execution module 603, in conjunction with database comparison module 604, may determine context-based alternative actions associated with the trigger and the identified context. Action execution module 603 may select one or more of the determined context-based alternative actions, and then execute the selected action(s).

Processor 210 or 540, via feedback generation module 601, may perform a feedback generation process, such as is described below in connection with FIG. 11 (Step 750). According to some embodiments, feedback generation module 601 may receive information associated with one or more wrist-related triggers identified in the real-time image data. Feedback generation module 601 may determine visible and/or audible or other feedback for output to user 100. Feedback generation module 601 may configure the feedback, and then provide the feedback to feedback-outputting unit 230 or 545 for output to user 100.

Figure 8A:
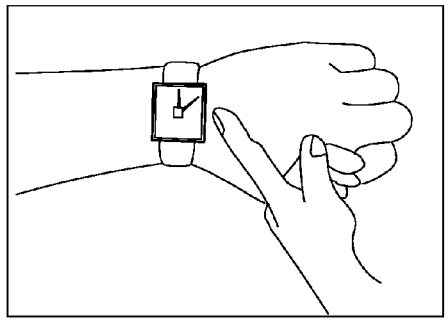
FIG. 8A is an example illustration of a wrist-related trigger for an apparatus for providing feedback to a person based on a trigger, consistent with disclosed embodiments.

FIGS. 8A-8F illustrate examples of wrist-related triggers, consistent with certain disclosed embodiments. FIG. 8A illustrates an example field of view of image sensor 220 of apparatus 110. In the example of FIG. 8A, the left hand and wrist of a user, such as user 100, is present within the field of view of image sensor 220. As shown, the left hand is formed in a closed or semi-closed fist and is positioned sideways in a manner consistent with user 100 checking the time indicated on the wristwatch placed on the left wrist of user 100. The right hand of user 100 is also present within the field of view, and is pointing to the wristwatch positioned on the wrist region below the left hand, where a wristwatch is commonly worn. In some embodiments, a "pointing" hand trigger as illustrated in FIG. 8A may result in execution of one or more actions relating to the object being pointed at. For example, when user 100 points at a wristwatch positioned on the user's hand, as in FIG. 8A, apparatus 110 may detect the action (as will be described below), and audibly announce (or visibly display) an indication of the current time. In other examples, the left and right hand may switch positions, having the wristwatch positioned on the right wrist region and having the left hand pointing toward the wristwatch. In yet other examples, the left hand may be formed in an open palm position. In other embodiments, a pointing hand trigger pointing at a clock or other timekeeping device not positioned on the user's wrist may also result in the output of a current time. A pointing hand trigger may also be used in disclosed embodiments for any action that provides more information about an object within the field of view of apparatus 110.

Figure 8B:
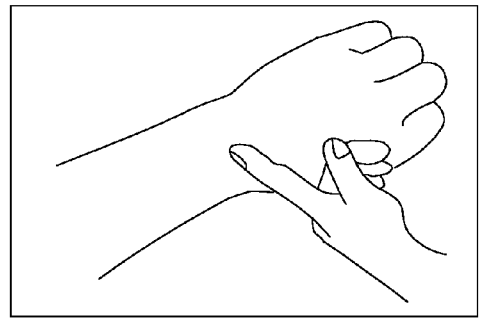
FIG. 8B is an example illustration of a wrist-related trigger for an apparatus for providing feedback to a person based on a trigger, consistent with disclosed embodiments.

FIG. 8B illustrates another example field of view of image sensor 220 of apparatus 110. In the example of FIG. 8B, the left hand and wrist of a user, such as user 100, is present within the field of view of image sensor 220. Similar to FIG. 8A, the left hand is formed in a closed or semi-closed fist and is positioned in a manner consistent with user 100 checking the time as if a wristwatch were placed on the wrist of user 100. The right hand of user 100 is also present within the field of view, and is pointing to a wrist region of the left wrist where a wristwatch is commonly worn. In other examples, the left and right hand may switch positions, having the left hand pointing at the right wrist. In yet other examples, the left hand may be formed in an open palm position. In some embodiments, the "pointing" hand trigger as illustrated in FIG. 8B may result in execution of one or more actions upon identifying a wrist region of user 100. For example, when user 100 points at a wrist region on the user's wrist, as in FIG. 8B, apparatus 110 may detect the action (as will be described below), and audibly announce (or visibly display) an indication of the current time.

Figure 8C:
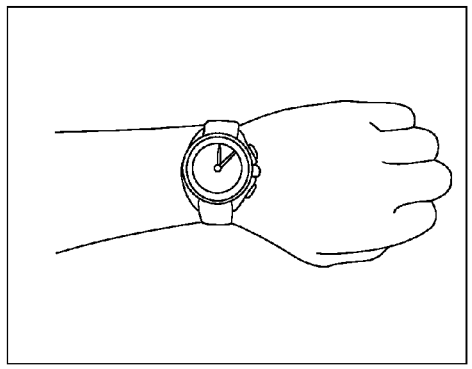
FIG. 8C is an example illustration of a wrist-related trigger for an apparatus for providing feedback to a person based on a trigger, consistent with disclosed embodiments.

FIG. 8C illustrates another example field of view of image sensor 220 of apparatus 110. In the example of FIG. 8C, the left hand and wrist of a user, such as user 100, is present within the field of view of image sensor 220. Similar to FIGS. 8A and 8B, the left hand is formed in a closed or semi-closed fist and is positioned in a manner consistent with user 100 checking the time on a wristwatch worn on the wrist of user 100. In some embodiments, the "check time" wrist-related trigger as illustrated in FIG. 8C may result in execution of one or more actions upon identifying a wristwatch positioned on a wrist region of user 100. For example, when user 100 positions his arm to check the time (or looks at his wrist so as to check the time), apparatus 110 may detect the action (as will be described below), and audibly announce (or visibly display) an indication of the current time. In other examples, the right hand may replace the left hand. In yet other examples, the left hand may be formed in an open palm position.

Figure 8D:
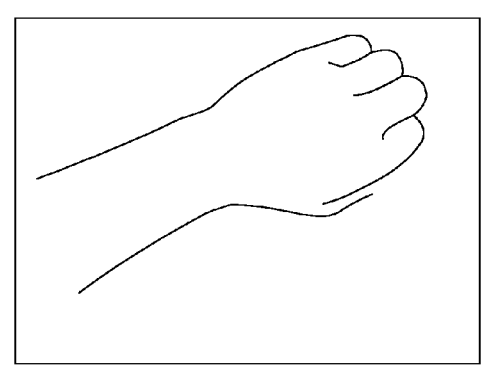
FIG. 8D is an example illustration of a wrist-related trigger for an apparatus for providing feedback to a person based on a trigger, consistent with disclosed embodiments.

FIG. 8D illustrates another example field of view of image sensor 220 of apparatus 110. In the example of FIG. 8D, the left hand and wrist of a user, such as user 100, is present within the field of view of image sensor 220. Similar to FIG. 8C, the left hand is formed in a closed or semi-closed fist and is positioned in a manner consistent with user 100 checking the time as if a wristwatch were placed on the wrist of user 100. In some embodiments, a "check time" wrist-related trigger as illustrated in FIG. 8D may result in execution of one or more actions relating to a determination of the current time upon identifying a wrist region of user 100. For example, when user 100 looks at a wrist region of his wrist, as in FIG. 8D, apparatus 110 may detect the action (as will be described below), and audibly announce (or visibly display) an indication of the current time. In other examples, the right hand may replace the left hand. In yet other examples, the left hand may be formed in an open palm position.

Figure 8E:
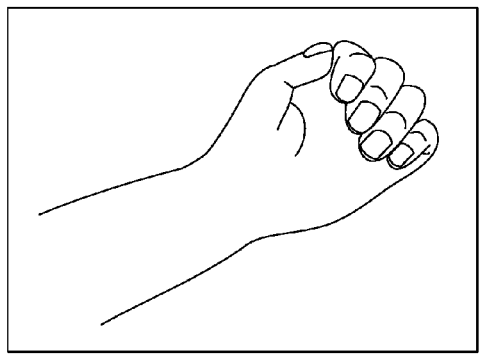
FIG. 8E is an example illustration of a wrist-related trigger for an apparatus for providing feedback to a person based on a trigger, consistent with disclosed embodiments.

FIG. 8E illustrates another example field of view of image sensor 220 of apparatus 110. In the example of FIG. 8E, the left hand and wrist of a user, such as user 100, is present within the field of view of image sensor 220. Similar to FIG. 8D, the left hand is formed in a closed or semi-closed fist, however, in this example, the inside portion of user's wrist may function as a wrist-related trigger. In some embodiments, a wrist-related trigger as illustrated in FIG. 8E may result in execution of one or more actions relating to a determination of the current time upon identifying the inside wrist region of user 100. For example, when user 100 looks at the inside portion of his wrist, as in FIG. 8E, apparatus 110 may detect the action (as will be described below), and audibly announce (or visibly display) an indication of the current time. In other examples, the right hand may replace the left hand. In yet other examples, the left hand may be formed in an open palm position.

Figure 8F:
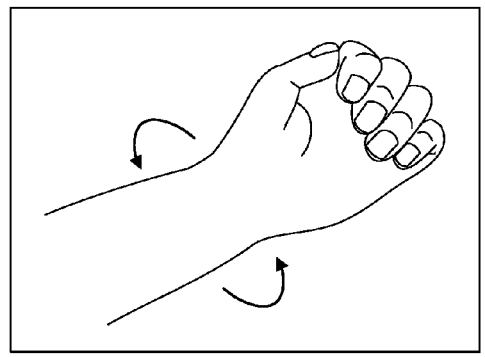
FIG. 8F is an example illustration of a wrist-related trigger for an apparatus for providing feedback to a person based on a trigger, consistent with disclosed embodiments.

FIG. 8F illustrates another example field of view of image sensor 220 of apparatus 110. In the example of FIG. 8F, the left hand and wrist of a user, such as user 100, is present within the field of view of image sensor 220. Similar to FIGS. 8D and 8E, the left hand is formed in a closed or semi-closed fist, however, in this example, motion of the user's wrist so that both an inside and an outside portion of the user's wrist are present in image data may function as a wrist-related trigger. In some embodiments, a wrist-related trigger as illustrated in FIG. 8F may result in execution of one or more actions relating to a determination of the current time upon identifying the motion of the user's wrist. For example, when user 100 motions so as to rotate his wrist as in FIG. 8F, apparatus 110 may detect the action (as will be described below), and audibly announce (or visibly display) an indication of the current time. In some embodiments, the rotation of a user's wrist for a wrist-related trigger may vary. For example, a wrist-related trigger may correspond to a ninety 90 degree or approximately 180 degree rotation or some rotation in a predefined sequence. In other examples, the right hand may replace the left hand. In yet other examples, the left hand may be formed in an open palm position.

The above described wrist-related triggers for receiving feedback of a current time are provided by way of example only. In some embodiments, the identified wrist-related triggers may be pre-defined or programmed based on a user's particular preference and/or to perform any number of beneficial actions. Other possible wrist-related triggers and variations of the above described wrist-related triggers are also contemplated by the present disclosure. For example, in some embodiments, a wrist-related trigger may comprise an erratic or atypical movement of the wrist or hand or of an object associated with the hand. Additionally, in some embodiments, a wrist-related trigger may be defined by a dwell time, such as a predefined duration (e.g. 0.5, 1, 2 seconds, etc.) for which a wrist-related trigger is identified in the image data. In some embodiments, a wrist-related trigger may be defined by a predefined time duration (e.g., 0.5 seconds, 1 second, 2 seconds, etc.) during which the wrist is not visible and/or is not positioned in a predefined pose, followed by a predefined time duration (e.g. 0.5 seconds, 1 second, 2 seconds, etc.) during which the wrist identified in the image data is positioned in a predefined pose. In some embodiments, one or more of the above-described wrist-related triggers may be combined to form a wrist-related trigger. Further, although FIGS. 8A-8F depict a hand formed in a closed or semi-closed fist, such positioning is merely exemplary and the hand of user 100 may be positioned in any appropriate or desired position by user 100 (e.g., the fingers of the hand of user 100 may be partially or fully extended). Additionally, while the above examples illustrate a left wrist of a user, the right wrist of a user may similarly be used as a wrist-related trigger. Other analysis of a wrist-related trigger may also be performed. For example, in some embodiments, processor 210 or 540 may identify a particular orientation of a user's wrist such as recognition that a viewing angle is near orthogonal to the top (outside) or underside (inside) of the wrist.

In some embodiments, a determination as to whether to perform an action based on an identified wrist-related trigger may be made based on a confidence score applied to the identified wrist-related trigger. For example, in some embodiments, feedback of time information to a user 100 may be performed if a confidence score meets or exceeds some predetermined threshold. In some embodiments, the confidence score may be based on a degree of certainty that what is detected in the analyzed image data corresponds to a wrist-related trigger. Certain of the above described wrist-related triggers may correspond to a greater confidence score based on the nature of the wrist-related trigger. For example, in the embodiments shown in FIGS. 8A and 8B, the presence of a finger pointing to the wrist region of a user may correspond to a greater confidence score than detection of a wrist region by itself. A confidence score for one or more of the above described wrist-related triggers may be combined when the triggers are identified within a set period of time, for example. Other contextual information analyzed in the image data or other external information such as an audible trigger may also be taken into consideration when determining a confidence score for a detected wrist-related trigger.

In embodiments in which user 100 is wearing a wristwatch (e.g., as shown in FIGS. 8A and 8C) or has initiated a trigger in relation to a clock in his or her environment, apparatus 110 may provide feedback (e.g., the current time) by analyzing image data that includes images of the wristwatch. For example, apparatus 110 may analyze image data collected by image sensor 220 of apparatus 110 and determine the time shown on the wristwatch worn by user 110. Alternatively, in embodiments in which user 100 is not wearing a wristwatch (e.g., as shown in FIGS. 8A and 8C), apparatus 110 may provide feedback (e.g., the current time) that is maintained by apparatus 110 and/or computing device 120. For example, memory 550 of apparatus 110 may include program instructions for maintaining a current time, day, and/or date. Alternatively, or in addition, computing device 120 may include program instructions for maintaining a current time, day, and/or date, which may be transmitted to apparatus 110 over a wired or wireless communication pathway. In other embodiments, apparatus 110 and/or computing device 120 may obtain a current time, day, and/or date or time from another source, such as, for example, another computing device and/or server (e.g., server 250) over network 240.

In other embodiments, a number of other beneficial time-related actions may also be performed. In some embodiments, in addition (or alternatively) to outputting a current time, apparatus 110 and/or computing device 120 in communication with apparatus 110 may output other time information related to an appointment or other task scheduled for the day. For example, upon detecting a wrist-related trigger of the disclosed embodiments, feedback may be provided as a reminder of an upcoming task or appointment, or as an indication of how much time remains before the next scheduled task or appointment. Apparatus 110 may coordinate with one or more data sources to retrieve calendar related information and may coordinate with a calendar function associated with those data sources, which may be provided by computing device 120, to perform the desired functionality. As another example, after detecting a wrist-related trigger according to any of the disclosed embodiments, apparatus 110 may start a stop watch. Further, in some embodiments, after the stop watch is started, apparatus 110 may optionally provide feedback associated with the amount of time measured by the stopwatch, such as announcing the measured time at predefined intervals, beeping at predefined intervals, and so on. Further, by a way of example, detection of an additional (or different) wrist-related trigger while a stop watch is active may cause apparatus 110 to provide feedback associated with the measured time. Further, by a way of yet another example, after detecting an additional (or different) wrist-related trigger while a stop watch is active, apparatus 110 may stop the stopwatch and optionally record the measured time and/or provide feedback associated with the measured time. As yet another example, after detecting a wrist-related trigger, apparatus 110 may activate a timer, and the timer may count time down to zero and provide feedback when reaching zero, and apparatus 110 may optionally provide continued feedback associated with the progress of the timer before reaching zero (e.g., provide the countdown at periodic intervals, such as every second, every 2 seconds, every 5 seconds, every 10 seconds, etc.). Further by a way of yet another example, apparatus 110 may measure a duration of time that is predefined. Alternatively, the user may provide the desired duration, for example through audio input. In some embodiments, different types of wrist-related triggers, and/or different combinations of wrist-related triggers together with other triggers, may cause different actions. For example, while one of the wrist-related triggers as shown in FIGS. 8A-8B may cause feedback including an indication of the current time, combining the same wrist-related trigger together with motion of the pointing finger from side to side may cause a stop watch related action, while a combination of a wrist-related trigger with audio input of a time duration may activate a timer.

In the disclosed embodiments, the detection of any of a variety of wrist-related triggers of a user of apparatus 110 may result in an associated action. In some embodiments, apparatus 110 may include additional capability to distinguish between a wrist-related trigger of a user of apparatus 110 and a wrist-related trigger associated with a person other than the user 100 so as to provide feedback to a user based on triggers associated with the user 100. For example, in some situations where user 100 is interacting closely with another person in a meeting or in conversation, or other situations, such as on public transportation or in a grocery store where user 100 is closely positioned near one or more other persons, systems without the ability to distinguish between a wrist-related trigger of user 100 and a person other than the user may provide unintended or unwanted feedback to a user based on triggers not associated with the user. In some environmental situations, it may be beneficial to distinguish between a wrist-related trigger associated with a user 100 and a person other than the user. In some embodiments, processor 210 or 540 may determine whether a current situation involves one or more persons other than a user based on analyzed image data or other external data. For example, when one or more other persons are detected in analyzed image data, processor 210 or 540 may perform additional analysis to determine whether a wrist-related trigger is associated with a user 100. In these situations, when a detected wrist-related trigger is determined to be associated with a person other than the user of apparatus 110, it may be beneficial to withhold performing any action that may otherwise result from the detected wrist-related trigger.

In some embodiments, as discussed below with respect to FIG. 9, it may thus be beneficial to determine whether a wrist-related trigger is associated with a user 100 before determining whether to perform a particular action.

Figure 9:
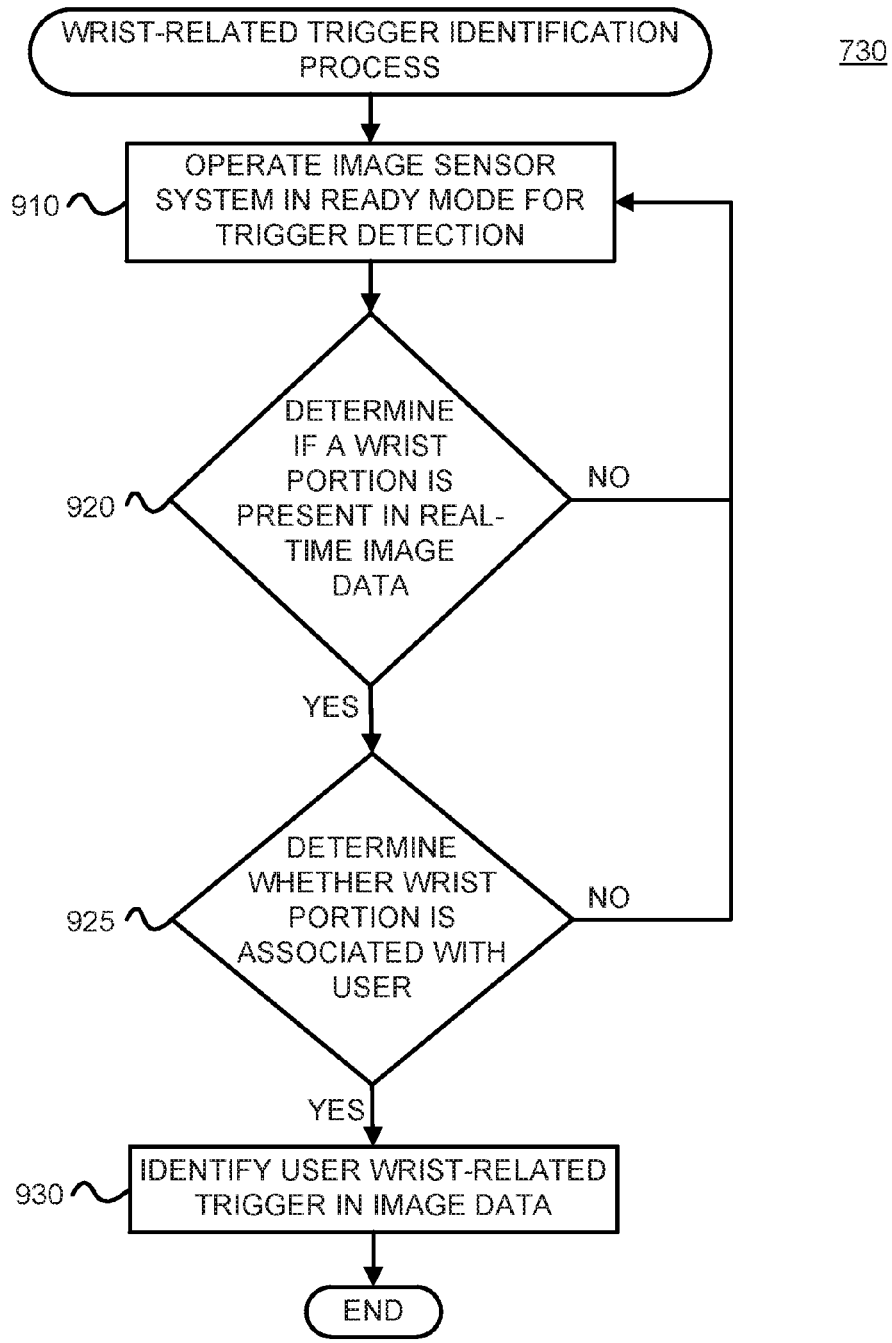
FIG. 9 is an example of a wrist-related trigger identification process, consistent with disclosed embodiments.

FIG. 9 illustrates an example wrist-related trigger identification process such as that described above in association with Step 730 of process 700 consistent with certain disclosed embodiments. Process 730, as well as any or all of the individual steps therein, may be performed by various aspects of device 110, computing device 120, or any sub-components therein. For exemplary purposes, FIG. 9 is described as being performed by processor 210 or 540, executing software instructions stored within memory 550.

Processor 210 or 540, via trigger identification module 602, may operate image sensor 220 in a normal manner, or "ready mode," while awaiting trigger detection (Step 910). In some embodiments, apparatus 110 may be configured to always operate in a ready mode when no operations are active. In other embodiments, user 100 may be able to place apparatus 110 into a ready mode such that a wrist-related trigger (or any external trigger, visible or auditory) may be detected. In other embodiments, apparatus 110 may be configured to enter into a ready mode after detecting a trigger of a different kind, such as a button press, a voice trigger, another visual trigger, and so on. In other embodiments, apparatus 110 may be configured to enter into a ready mode as a result of identifying one or more specific visual triggers. In other embodiments, apparatus 110 may be configured to enter into a ready mode at predefined times. In some embodiments, apparatus 110 may stay in a ready mode for unlimited time. In some other embodiments, apparatus 110 may exit a ready mode after a predefined time duration (e.g., 0.5 seconds, 1 second, 2 seconds, etc.), as a result of identifying a trigger, and so forth.

While in ready mode, trigger identification module 602 may determine if at least a portion of a wrist or wrist region is present in the real-time image data (Step 920). In some embodiments, the portion of the wrist may correspond to an outside-portion of the wrist on which a wristwatch is typically worn and the face of the wristwatch is typically viewed (as similarly shown in FIGS. 8A-8D), or an inside portion of a wrist (as shown in FIGS. 8E and 8F). The wrist may correspond to the wrist of user 100 or the wrist of another person. In some embodiments, trigger identification module 602 may be configured to recognize the particular wrist and/or hand of the user 100 that is operating apparatus 110. In these embodiments, apparatus 110 may initially prompt user 100 to mime various hand and/or wrist-related triggers. Trigger identification module 602 may capture images of the various wrist-related triggers and store them in one or both of memory 550 or database(s) 605 for ready recognition in the future. In alternative embodiments, trigger identification module 602 may not be configured to recognize a particular wrist or hand, and may be pre-configured to recognize any hand and wrist, similar appendage, or equivalent substitute. In some embodiments, trigger identification module 602 may be configured to recognize the shape of a hand and/or wrist region when it is covered in a glove, mitten, or other covering, such as a sweater, jacket or long-sleeved shirt.

If no wrist or wrist region is detected as present in the real-time image data (Step 920: NO), trigger identification module 602 may configure image sensor 220 to continue to operate in ready mode, waiting for a future trigger, or some other trigger. Optionally, if no wrist or wrist region is detected as present in the real-time image data (Step 920: NO) other processes may take place, such as other visual identification tasks. If a wrist or wrist region is determined to be present (Step 920: YES), then trigger identification module 602 may determine if the wrist is associated with the user 100 of apparatus 110 (Step 925).

In some embodiments, as part of step 925, trigger identification module 602 may analyze the captured image data to determine whether the identified wrist or wrist region is associated with user 100. Trigger identification module 602 may consider a number of image data aspects and features for the determination consistent with the disclosed embodiments, including identifying a context of the detected wrist and/or hand, identifying a position of the wrist and/or hand in the field of view, assessing the environment for the presence of others, determining the identity of detected persons in the field of view, determining an amount of space that the detected wrist region occupies in an image, and determining a distance of the detected wrist from the apparatus 110. A determination may also be made based on one or more other criteria, including, for example, a confirmation or rejection signal from user 100, or other external information such as an auditory signal, as well as historical information regarding the environmental situation or other learned and/or programmed assessments of the situation.

In some embodiments, trigger identification module 602 may determine whether a detected wrist region is associated with user 100 based on whether the detected wrist region occupies a threshold amount of space in at least one image of the analyzed image data. The threshold amount of space may be predefined or learned and programmed based on a number of test images of a wrist of user 100, for example. In some embodiments, the predefined threshold of space that a user's wrist must occupy in an image to be associated with user 100 may be defined as at least a predefined percentage of the image, such as ten percent (10%), fifteen percent (15%), twenty percent (20%), and so forth. Other thresholds may be used based on various characteristics of user 100, such as size or age, and/or based on one or more image sensor capture settings. In some embodiments, a threshold amount of space may be based on a predefined or learned wrist-related trigger. For example, a wrist-related trigger for outputting a current time consistent with the disclosed embodiments may be defined based on a relative size of the wrist region or a distance user 100 holds out his or her arm when performing the wrist-related trigger, which may affect the amount of space the wrist region occupies in the image data.

In some embodiments, trigger identification module 602 may determine whether a detected wrist region is associated with user 100 based on the relative size of the detected wrist region in comparison to an anticipated size. In some embodiments, a size of the detected wrist region may be based on the relative size of the detected wrist in comparison with a known size of one or more other detected objects identified in the field of view, such as a wristwatch, a mug, a pen, a product, a tree, a landmark or the figure of a person, etc. In some embodiments, the comparison may be based on information known regarding the identified objects stored in database 605, for example. In another embodiment, the determination may be based on a distance of the detected wrist from user 100 and/or the image sensor, for example, by excluding identified wrists at distances longer than a specified maximum distance and/or shorter than a specified minimal distance. Examples of a maximum distance include eighty (80) centimeters, one hundred (100) centimeters, and so forth. Trigger identification module 602 may determine an approximate distance of the detected wrist from apparatus 110 based on the comparison with known sizes of other objects. Numerous other ways of determining a distance of the wrist region away from a user are contemplated by the present disclosure, as discussed below.

When the amount of space occupied by the wrist region is less than a predetermined threshold or an approximate distance of the wrist region meets or exceeds a predetermined threshold, trigger identification module 602 may determine that the detected wrist is associated with a person other than user 100 (Step 925: NO). In addition, in some embodiments, the location of the wrist region in the image may also be used to determine that the detected wrist is associated with a person other than user 100. As a result, trigger identification module 602 may withhold any action based on the detected trigger and return to Step 910 such that image sensor 220 continues to operate in ready mode, waiting for a future trigger. Other possible results include: waiting for a predefined length of time before returning to Step 910, searching for other hand gestures, and so forth. Thus, in some embodiments, trigger identification module may only execute certain actions based on a determination that a detected wrist-related trigger is associated with a user 100.

Other image processing techniques based on known parameters of image sensor 220 may also be used to determine the size and distance of the detected wrist from the image sensor 220. Additionally, in some embodiments in which a first image sensor 220a and a second image sensor 220b (such as shown in FIG. 5B) are implemented, the image data from the two image sensors may be analyzed using known techniques to determine the distance of the detected wrist from the image sensor. Other known techniques based on an infrared proximity sensor or other optical distance sensors, and/or an ultrasonic distance sensor, for example, may also be used to determine the distance of a detected object from the sensor. For example, any known sensor technology for determining distance based on a reflected or received signal may be implemented in apparatus 110.

If trigger identification module 602 determines that the detected wrist region is associated with the user 100 of apparatus 110 (Step 925: YES) then trigger identification module 602 may determine if the wrist and/or hand is performing a recognized wrist-related trigger gesture (Step 930). For example, a wrist-related trigger gesture may be defined by a position of the wrist in the field of view, as well as a formation of a hand associated with the wrist. In some embodiments, a wrist-related trigger gesture may include a pointing hand trigger pointing to a wrist region. Examples of possible wrist-related triggers are discussed above in association with FIGS. 8A-8F, but additional wrist actions may be recognized by trigger identification module 602. Some wrist-related triggers may be associated with an object, such as wristwatch, as shown in FIGS. 8A and 8B. Trigger identification module 602 may interact with database comparison module 604 to search a database, such as database 605, for recognized wrist triggers and objects associated with a wrist trigger. As similarly discussed above, trigger identification module 602 may determine whether a wrist-related trigger is present based on a confidence score associated with the identified wrist-related image data. The identified user wrist-related trigger may then be used to determine one or more actions to be performed and/or feedback to be provided to user 100.

While process 730 of FIG. 9 illustrates determination of whether a wrist portion is associated with user 100 (step 925) prior to identifying the user wrist-related trigger (step 930), in some embodiments, the steps may be arranged in a different order. For example, a determination whether a wrist-related trigger is present may be made prior to analyzing whether a detected wrist portion is associated with a user 100. In some embodiments, the steps may be combined such that determination as to whether a detected wrist portion is associated with a user 100 may be used to calculate a confidence score to determine whether a wrist-related trigger is present in the image data. For example, where one or more other persons are identified in the image data, a confidence score for any wrist-related trigger may be adjusted (or the threshold may be adjusted), such that a greater confidence is needed to perform an action associated with an identified wrist-related trigger.

Figure 10:
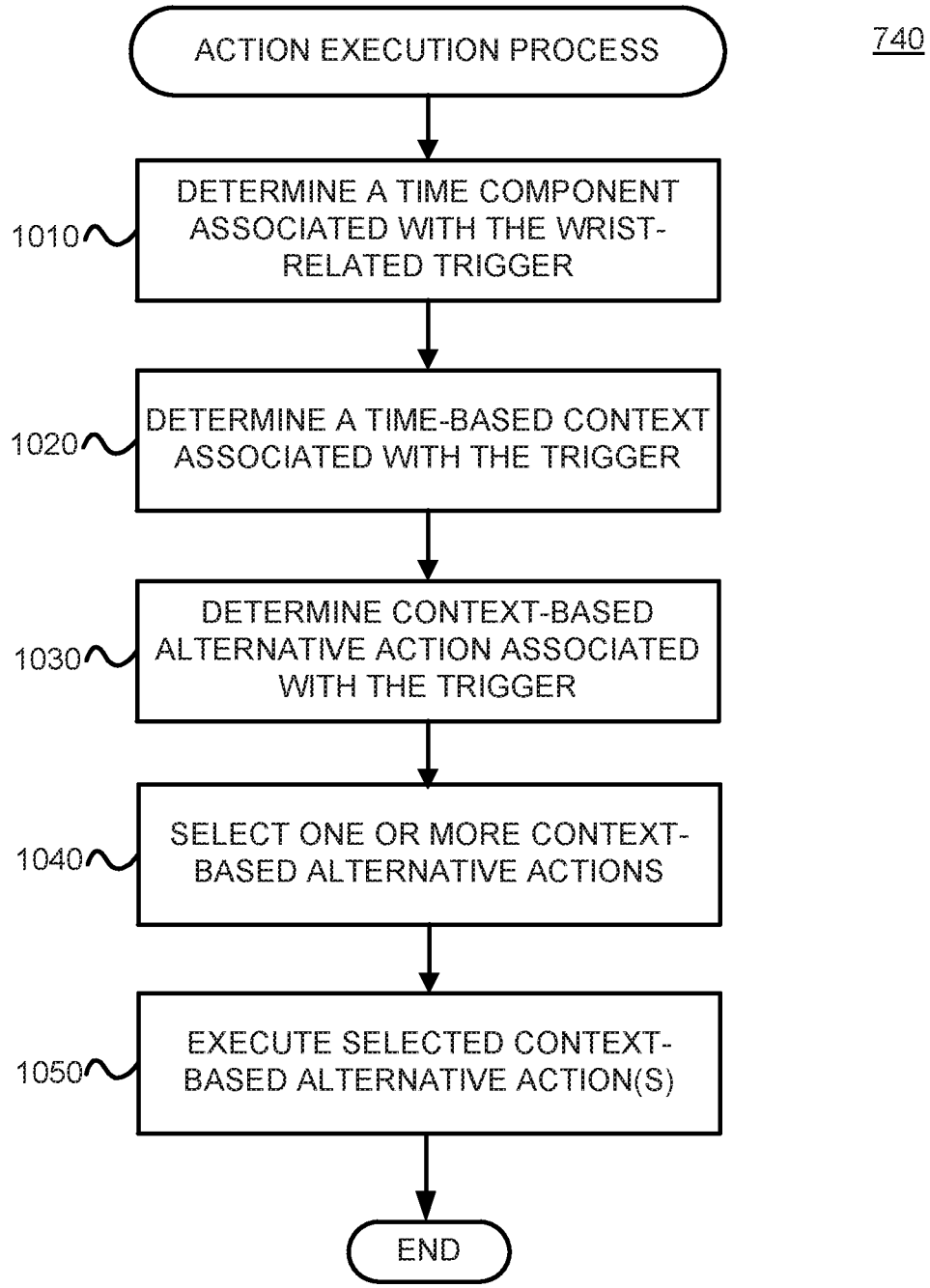
FIG. 10 is an example of an action execution process, consistent with disclosed embodiments.

FIG. 10 illustrates an example action execution process such as that described above in association with Step 740 of process 700 consistent with certain disclosed embodiments. Process 740, as well as any or all of the individual steps therein, may be performed by various aspects of device 110, computing device 120, or any subcomponents therein. For exemplary purposes, FIG. 10 is described as being performed by processor 210 or 540, executing software instructions stored within memory 550.

Processor 210 or 540, via trigger identification module 602 and action execution module 603, may determine an action to be associated with an identified wrist-related trigger. In some embodiments, the trigger may be a wrist-related trigger that may be identified and processed using wrist-related trigger identification process 730 described above. In other embodiments, other triggers may be identified and processed by trigger identification module 602, such as the appearance of a particular object into the field of view of apparatus 110, including the figure of a person known to user 100. In these embodiments, trigger identification module 602 may be configured to automatically identify and process the trigger when it appears. Alternatively, trigger identification module 602 may be configured to identify and process the trigger when user 100 focuses on the object using apparatus 110. In some embodiments, trigger identification module 602 may be configured to identify and process multiple triggers substantially simultaneously within the same field of view.

Once trigger identification module 602 has identified and processed the relevant triggers present in the real-time image data, trigger identification module 602 and action execution module 603 may determine whether to perform one or more actions associated with the identified triggers. In some embodiments in which the identified trigger is a wrist-related trigger identified in process 730, trigger identification module 602 and action execution module 603 may first determine a time component associated with the wrist-related trigger (Step 1010). In some embodiments, the time component may be based on the nature of the received and processed image data. For example, when the image data is processed as a video stream, a time component may correspond to a duration of time for which the wrist-related trigger appears in the image data. In another embodiment, when the image data is processed as a series of images, the time component may correspond to a number of consecutive images for which the wrist-related trigger appears in the image data.

In some embodiments, one or more actions associated with the identified wrist-related trigger may be performed when the determined time-component meets or exceeds a pre-defined or programmable threshold. For example, when the image data includes a video stream, one or more actions may be performed when the wrist-related trigger appears in the image data for at least two or three seconds, or more. In another example, when the image data includes a still image, one or more actions may be performed when the wrist-related trigger appears in three or more consecutive images. The threshold number of consecutive images may be determined based on a capture rate of image data, and thus may be many more than three images in some embodiments. For example, the threshold number of images may correspond to the number of images that may be captured in a two or three second duration similar to the above video stream example. When it is determined that a threshold associated with the determined time component has not been met, process 740 may withhold performing an action until a future wrist-related trigger satisfies the threshold.

Processor 210 or 540, via trigger identification module 602, action execution module 603, and database comparison module 604, may determine a context associated with the identified wrist-related trigger (Step 1020). In some embodiments, processor 210 or 540 may determine a time-based context based on real-time image data received from image sensor 220 and/or other calendar related information retrieved from a number of other sources. In some embodiments, for example, a context may be fully or partly determined based on a geographical position, a time of day, and so forth. In some embodiments, apparatus 110 may recognize a familiar context based on prior experience, or based, for example, on context information pre-programmed into memory 550 or database(s) 605. In these embodiments, database comparison module 604 may identify known and familiar contexts associated with various triggers within database(s) 605. For example, some known contexts may include some part of a daily routine, a workplace, or a setting of a meeting, as well as numerous others in which a calendar or schedule of events may be relevant. In some embodiments, a context may be determined based on calendar related information retrieved from one or more sources. Alternatively, the context determined from the image sensor data may not be recognized or familiar, and processor 210 or 540 may prompt user 100 to provide information relating to the context via an audio prompt or via a user interface visible to user 100 within the field of view of apparatus 110. Apparatus 110 may receive the context information in these embodiments from user 100, and then database comparison module 604 may use the received information to search database(s) 605 or other sources for relevant calendar entries or other context information. In some embodiments, no time-based context may be determined as associated with the wrist-related trigger.

Additionally, processor 210 or 540 may call action execution module 603 to determine one or more context-based alternative actions associated with the identified wrist-related trigger and time-based context, if any (Step 1030). In some embodiments, action execution module performs such alternative actions in addition to any feedback generated by feedback generation module 601. In other embodiments, the alternative actions are performed instead of the feedback generation.

One skilled in the art may contemplate a multitude of alternative actions that may be associated with an identified wrist-related trigger for a given context. Alternative actions may include, but not be limited to, audibly or visibly outputting a current time of day, audibly or visibly outputting an indication related to a next scheduled event or ending of a current event, sending an electronic message or instant message over the Internet related to a calendared event, activating a display of the current time or a user interface, which may appear on the lens of the glasses within the vision of user 100 and provide additional interactivity options.

Various alternative actions available for execution by action execution module 603 may be stored in database entries within database(s) 605 associated with various objects, contexts and triggers. In these embodiments, processor 210 or 540 may call database comparison module 604 to access and extract possible alternative actions, then transmit the possible actions to action execution module 603 for execution.

Action execution module 603 may select one or more of the context-based alternative actions presented for execution (Step 1040). In some embodiments, action execution module 603 may select a single alternative action for execution based on the context or lack of context. For example, in some embodiments a single alternative action may include the output of a current time of day, regardless as to whether a context or other calendared event have been determined. In other embodiments, action execution module 603 may select multiple alternative actions. In these embodiments, one or more of the alternative actions may be sequential; for example, an alternative action may only be executed if another particular action is executed beforehand. Upon selecting one or more of the alternative actions, action execution module 603 may execute various software instructions to perform the action (Step 1050). For example, if the action involves an audible output to user 100, action execution unit 603 may employ feedback generation module 601 and feedback-outputting unit 230 or 545 to generate, configure, and output the audible information, as will be discussed in further detail below. In some embodiments, processor 210 or 540 may be configured to rapidly adjust the alternative actions available to action execution module 603 based on changes that may be identified in one or more of a trigger or a context related to the trigger. In these embodiments, as these elements change, processor 210 or 540 may call database comparison module 604 to search database(s) 605 for new alternative actions associated with the newly-changed trigger or context.

As a non-limiting example of an automatic action selection process, such as that described above in association with FIG. 7, apparatus 110 may determine that a wrist-related trigger is present, that the wrist-related trigger is associated with user 100, and that the wrist-related trigger is associated with determining a current time of day. Database comparison module 604 may then search database(s) 605 or other information sources for possible contexts involved with the current time. Database comparison module 604 may determine possible contexts, such as an upcoming meeting, appointment, or deadline to complete a task, etc. Database comparison module 604 may then determine one or more alternative actions associated with the trigger and the context. Here, database comparison module 604 may determine that alternative actions may include audibly announcing the time of day and the number of minutes before the next scheduled event, along with an indication of the event. Upon determining the possible alternative actions, database comparison module 604 may pass the possible actions to action execution module 603, which may select and execute one or more of the actions. Action execution module 603 may execute software instructions to determine the current time, an indication of the next event, and the number of minutes remaining before the next event, then generate, configure, and output audible or visible announcements of the time via feedback generation module 601 and feedback-outputting unit 545. This process will now be described in further detail.

Figure 11:
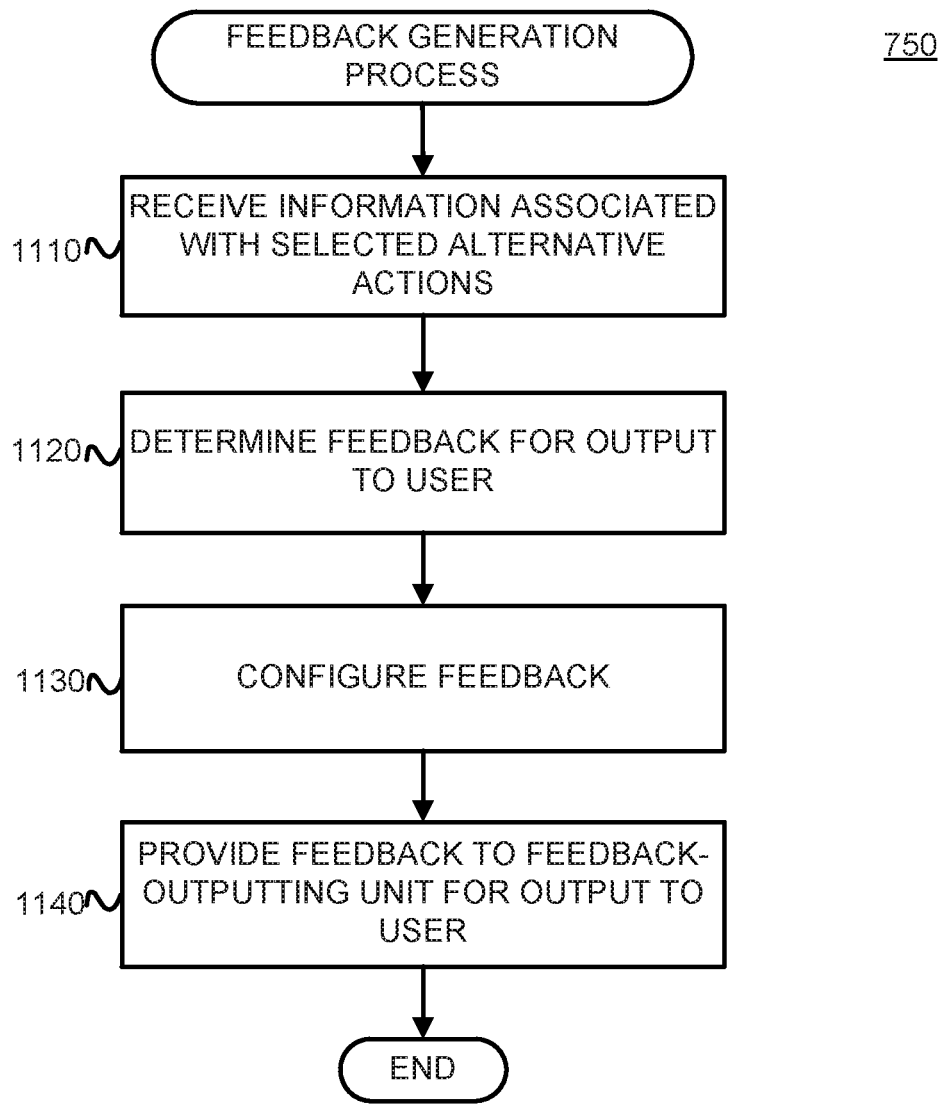
FIG. 11 is an example of a feedback generation process, consistent with disclosed embodiments.

FIG. 11 illustrates an example feedback generation process such as that described above in association with Step 750 of process 700 consistent with certain disclosed embodiments. Process 750, as well as any or all of the individual steps therein, may be performed by various aspects of device 110, computing device 120, or any subcomponents therein. For exemplary purposes, FIG. 11 is described as being performed by processor 210 or 540, executing software instructions stored within memory 550.

As discussed above, processor 210 or 540, via feedback generation module 601, may receive information associated with one or more selected alternative actions (Step 1110). The received information may further comprise information relating to a result of one or more executed alternative actions, as discussed above. Based on the received information, feedback generation module 601 may determine a desired feedback for output to user 100 (Step 1120). The feedback may include any one or more of audible, visible, tactile, or other type of feedback consistent with the disclosed embodiments. In some embodiments, the executed alternative action may each already be associated with an audible or visible feedback file stored in memory 550 or database(s) 605. In these embodiments, feedback generation module 601 may simply access the existing associated feedback file and prepare it for transmission. In other embodiments, there may be multiple feedback files associated with the selected alternative actions, and feedback generation module may review the determined trigger and/or context information to determine the correct associated feedback to output to user 100. In still other embodiments, there may be no existing feedback file associated with the selected actions. In these embodiments, feedback generation module 601 may determine content for audible or visible feedback by prompting user 100 for the feedback, or may infer proper feedback, based on context.

After determining the proper feedback to use, feedback generation module 601 may configure the feedback into a readable format, if necessary (Step 1130), then provide the feedback to feedback-outputting unit 230 or 545 for output to user 100 (Step 1140). Feedback generation module 601 may provide the feedback to feedback-outputting unit 230 or 545 via an electrical connection, or alternatively, via wireless transceiver(s) 530. In some embodiments, feedback-outputting unit 230 or 545 may be associated with a display (such as 260 shown in FIG. 5C) and configured to provide instructions to output visible feedback on the display.

In some embodiments, the identification of a new wrist-related trigger by apparatus 110 while feedback is being outputted by feedback-outputting unit 545 may cause at least one of the following actions to occur: providing additional feedback that is more detailed than the current feedback; repeating the current feedback from the beginning; stopping output of the current feedback; stopping output of the current feedback and starting to output different feedback based on the identification of the new wrist-related trigger. For example, when providing different feedback based on the identification of the new wrist-related trigger, the feedback may be selected from a list of possible alternative actions. Selection of the possible alternative action may be based at least on the new wrist-related trigger.

As discussed above, in some embodiments, the identification of a new wrist-related trigger by apparatus 110 while feedback is being outputted by feedback-outputting unit 545 may cause at least one action to occur. For example, at least processing device (e.g., processor 21) of apparatus may be programmed to identify in image data, while providing an output to a user, a new wrist-related trigger. The at least one processing device may be further configured to cause an action to occur based on at least the new wrist-related trigger. In some embodiments, the action may include providing additional information to the user. The additional information may be provided via, for example, feedback-outputting unit 545. For example, the additional information may include at least one of a day, a month, a year, or a weather forecast. For example, after providing the time information, based on the new-wrist related trigger, feedback-outputting unit 545 may provide additional information, such as a complete date or portion of a date (e.g., the day, month, and/or year). Further, the additional information may include other information, such as a weather forecast pertaining to the present day. In some embodiments, the action may include repeating output provided to user (e.g., repeating time information previously output via feedback-outputting unit 545 in response to a wrist-related trigger). In other embodiments, the action may include repeating an output to the user (e.g., repeating time information previously output via feedback-outputting unit 545 in response to a wrist-related trigger). In yet other embodiments, the action may include stopping output to the user (e.g., stopping time information being output via feedback-outputting unit 545 in response to a wrist-related trigger). Stopping the output may occur after the output has been initiated, and thus truncate or omit portions of the output. Further, stopping the output may occur near in time to the identification of the new wrist-related trigger (e.g., in response to identification of the new wrist-related trigger). Further, in still yet other embodiments, the action may include stopping the output to the user and providing a new output to the user. Apparatus 110 may select the new output based on, for example, the new-wrist related trigger. In some embodiments, apparatus 110 may select the new output based on the new-wrist related trigger and other information identified in an image (e.g., context information related to an image, such as an object, person, and/or activity in one or more images).

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable apparatus for providing time information, the wearable apparatus comprising:
    a wearable image sensor configured to capture real-time image data from an environment of a user of the wearable apparatus; and
    at least one processing device programmed to:
    identify in the image data a wrist-related trigger associated with the user based on at least a threshold amount of space that a portion of the user's wrist occupies in at least one image; and after identifying the wrist-related trigger and after the wrist-related trigger appears in the image data for more than a threshold time duration, output the time information.

2. The wearable apparatus of claim 1, wherein the wrist-related trigger includes identification of the portion of the user's wrist.

3. The wearable apparatus of claim 1, wherein the threshold amount of space that the wrist region occupies is at least 10 percent of the at least one image.

4. The wearable apparatus of claim 1, wherein the threshold amount of space that the wrist region occupies is at least 20 percent of the at least one image.

5. The wearable apparatus of claim 1, wherein the threshold time duration is at least 2 seconds.

6. The wearable apparatus of claim 1, wherein the time information includes an indication of a current time in relation to an activity.

7. The wearable apparatus of claim 1, wherein the at least one processing device is further programmed to provide the output to the user of the time information after the wrist-related trigger appears in the image data for more than a threshold number of consecutive images.

8. The wearable apparatus of claim 1, wherein the output to the user of the time information includes an audible output.

9. The wearable apparatus of claim 8, wherein the audible output is provided via a bone conduction headphone or a speaker in communication with the wearable device.

10. The wearable apparatus of claim 1, wherein the output includes a visual output provided on a display.

11. The wearable apparatus of claim 10, wherein the display is included as part of smartphone or tablet in communication with the wearable device.

12. The wearable apparatus of claim 1, wherein the wrist-related trigger includes identification of a near orthogonal view of one of the outside or inside portion of the user's wrist.

13. The wearable apparatus of claim 1, wherein the wrist-related trigger includes identification of a near orthogonal view of one of the outside or inside portion of the user's wrist associated with an identification of a rotation of the wrist into that position.

14. The wearable apparatus of claim 2, wherein the wrist-related trigger includes identification of a finger pointing to the wrist region of the user.

15. The wearable apparatus of claim 1, wherein the at least one processing device is further programmed to withhold providing an output to the user when it determines that a wrist-related trigger is associated with a person other than the user.

16. The wearable apparatus of claim 1, wherein the at least processing device is further programmed to:
identify in the image data, while providing the output to the user, a new wrist-related trigger; and
cause an action to occur based on at least the new wrist-related trigger.

17. The wearable apparatus of claim 16, wherein the action includes providing additional information to the user.

18. The wearable apparatus of claim 17, wherein the additional information includes at least one of a day, a month, a year, or a weather forecast.

19. The wearable apparatus of claim 16, wherein the action includes repeating the output to the user.

20. The wearable apparatus of claim 16, wherein the action includes stopping the output to the user.

21. The wearable apparatus of claim 16, wherein the action includes stopping the output to the user and providing a new output to the user.

22. A wearable apparatus for providing time information, the wearable apparatus comprising:
a wearable glasses unit and an image sensor associated therewith, the image sensor being configured to capture real-time image data from an environment of a user; and
at least one processing device programmed to:
identify in the image data a trigger, wherein the trigger is based on at least a threshold amount of space that a portion of the user's wrist occupies in at least one image; and
after identifying the trigger and after the trigger appears in the image data for more than a threshold time duration, output the time information.

23. The wearable apparatus of claim 22, wherein the trigger includes identification of a near orthogonal view of one of the outside or inside portion of the wrist region of the user.

24. The wearable apparatus of claim 23, wherein the trigger includes identification of a near orthogonal view of one of the outside or inside portion of the wrist region of the user and identification of a finger pointing to the wrist region.

25. The wearable apparatus of claim 22, wherein the at least one processing device is further programmed to withhold providing an output to the user when it determines that a wrist region is associated with a person other than the user.

26. The wearable apparatus of claim 22, wherein the wearable apparatus includes a housing containing the image sensor mounted on the glasses unit.

27. The wearable apparatus of claim 22, wherein the output to the user of the time information includes an audible output via a bone conduction headphone in communication with the wearable device.

28. A method for providing time information using a wearable device, comprising:
capturing, via a wearable image sensor of the wearable device, real time image data from an environment of a user;
identifying in the image data a trigger, wherein the trigger is based on at least a threshold amount of space that a portion of the user's wrist occupies in at least one image; and
after identifying the trigger and after the trigger appears in the image data for more than a threshold time duration, outputting the time information.

29. A non-transitory computer readable medium storing instructions for carrying out the method of claim 28.

* * * * *

UNITED STATES PATENT AND TRADEMARK OFFICE
CERTIFICATE OF CORRECTION

PATENT NO. : 10,019,625 B2
APPLICATION NO. : 15/167181
DATED : July 10, 2018
INVENTOR(S) : Yonatan Wexler et al.

Page 1 of 1

It is certified that error appears in the above-identified patent and that said Letters Patent is hereby corrected as shown below:

In the Claims

Column 31, Lines 52-53, "the at least processing device" should read --the at least one processing device--.

Signed and Sealed this
Eleventh Day of December, 2018

Andrei Iancu
*Director of the United States Patent and Trademark Office*